US008532087B2

(12) United States Patent
Kojima et al.

(10) Patent No.: US 8,532,087 B2
(45) Date of Patent: Sep. 10, 2013

(54) OPTICAL NETWORK, OPTICAL EDGE ROUTER, PROGRAM THEREOF, CUT THROUGH METHOD, AND EDGE ROUTER

(75) Inventors: Hisashi Kojima, Tokyo (JP); Takashi Kurimoto, Tokyo (JP); Ichiro Inoue, Tokyo (JP); Tomonori Takeda, Tokyo (JP); Takashi Miyamura, Tokyo (JP); Keisuke Kabashima, Tokyo (JP); Nobuaki Matsuura, Sayama (JP); Michihiro Aoki, Tokyo (JP); Shigeo Urushidani, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1042 days.

(21) Appl. No.: 10/544,156

(22) PCT Filed: Feb. 2, 2004

(86) PCT No.: PCT/JP2004/000981
§ 371 (c)(1),
(2), (4) Date: Aug. 1, 2005

(87) PCT Pub. No.: WO2004/071033
PCT Pub. Date: Aug. 19, 2004

(65) Prior Publication Data
US 2006/0126642 A1    Jun. 15, 2006

(30) Foreign Application Priority Data

Feb. 3, 2003  (JP) ................................. 2003-025954
Jun. 5, 2003  (JP) ................................. 2003-160807
Aug. 22, 2003 (JP) ................................. 2003-299120

(51) Int. Cl.
*H04L 12/66* (2006.01)

(52) U.S. Cl.
USPC ....................................................... 370/352

(58) Field of Classification Search
USPC ....................................................... 370/385
See application file for complete search history.

(56) References Cited

U.S. PATENT DOCUMENTS 6,483,833 B1 * 11/2002 Jagannath et al. ............ 370/392
7,272,146 B2 *  9/2007 Yamauchi .................. 370/395.53

(Continued)

FOREIGN PATENT DOCUMENTS

EP    0 731 582 A2    9/1996
EP    0 731 582 A3    9/1996

(Continued)

OTHER PUBLICATIONS

Xu, et al., IETF Draft, Jun. 2002, A BGP/GMPLS Solution for Inter-Domain Optical Networking.*

(Continued)

*Primary Examiner* — John Blanton
*Assistant Examiner* — Christopher Crutchfield
(74) *Attorney, Agent, or Firm* — Harness, Dickey & Pierce, P.L.C.

(57) ABSTRACT

An optical network has: sections for establishing optical paths; a plurality of optical edge routers for connecting external IP networks to the optical network (1001); and a plurality of optical cross connects, for connecting the optical edge routers by the optical paths, having switching sections with respect to an optical pulse unit. In the optical network, each of the optical edge routers has both of: (1) an optical network control instance (INSp) for maintaining topology information in the optical network and switching/signaling the optical paths; and (2) an IP network instance (INSi) for maintaining a routing table in each of the external IP networks and activating routing protocols between the external IP networks and the IP network instance. By doing this, it is possible to realize a multi-layer cooperative function and provide highly safe optical networks, etc.

2 Claims, 19 Drawing Sheets

(56) References Cited

U.S. PATENT DOCUMENTS

| | | | |
|---|---|---|---|
| 7,336,648 B1* | 2/2008 | Sasagawa | 370/351 |
| 2002/0009050 A1* | 1/2002 | Ueno | 370/230 |
| 2002/0067725 A1 | 6/2002 | Oguchi et al. | |
| 2002/0071437 A1 | 6/2002 | Nishikado et al. | |
| 2002/0109879 A1 | 8/2002 | Wing So | |
| 2003/0012189 A1 | 1/2003 | Nomura et al. | |
| 2003/0028818 A1 | 2/2003 | Fujita | |
| 2003/0147402 A1* | 8/2003 | Brahim | 370/395.53 |
| 2003/0214945 A1 | 11/2003 | Kawamura | 370/353 |
| 2004/0049597 A1* | 3/2004 | Ould-Brahim | 709/242 |
| 2004/0202171 A1 | 10/2004 | Hama | |

FOREIGN PATENT DOCUMENTS

| | | |
|---|---|---|
| EP | 1 089 506 A2 | 4/2001 |
| EP | 1 091 552 A2 | 4/2001 |
| JP | H11-275105 A | 10/1999 |
| JP | 2001-007848 A | 1/2001 |
| JP | 2001-136275 A | 5/2001 |
| JP | 2001-160840 | 6/2001 |
| JP | 2002-164937 A | 6/2002 |
| JP | 2002-208946 A | 7/2002 |
| JP | 2002-521860 | 7/2002 |
| JP | 2003-244209 | 8/2003 |
| JP | 2003-338835 A | 11/2003 |
| WO | 0067438 A | 11/2000 |
| WO | 0241589 A | 5/2002 |
| WO | 02099575 A2 | 12/2002 |

OTHER PUBLICATIONS

Eric, et al, Traffic engineering with MPLS, Jul. 17, 2002, Cisco Press, ISBN-10: 1-58705-031-5.*

Rosen, Viswanathan and Callon, Multiprotocol Label Switching Architecture, Internet Engineering Task Force, Jul. 2000.*

Xu, Basu and Xue, IETF Draft, Jun. 2002, A BGP/GMPLS Solution for Inter-Domain Optical Networking.*

Rosen, Viswanathan and Callon, Multiprotocol Label Switching Architecture, Internet Engineering Task Force, Jul. 2000, pp. 1-62.*

Xu, Basu and Xue, IETF Draft, Jun. 2002, A BGP/GMPLS Solution for Inter-Domain Optical Networking, pp. 1-26.*

Rajagoplan, Liciani, Aduche, Cain, Jamoussi and Saha, IP over Optical Networks: A Framework—Second Draft Version, Jun. 6, 2002, Internet Engineering Task Force, pp. 1-41.*

Braun, Guenter, and Khalil, Management of quality of service enabled VPNs, IEEE Communications Magazine, May 2001, pp. 90-98.*

D. Wang, J. Strand, G. Li, J. Yates, C. Kalmanek, G. Li and A. Greenberg, OSPF for Routing Information Exchange across Metro/Core Networks, Dec. 4, 2001, pp. 1-12.*

Mark Joseph Francisco, Stephen Simpson, Lambros Pezoulas, Changcheng Huang, Ioannis Lambadaris, Interdomain Routing in Optical Networks, Proceedings of SPIE Opticomm, Aug. 2001, pp. 1-10.*

Y. Xu, A. Basu and Y. Xue, IETF Draft, Jun. 2002, A BGP/GMPLS Solution for Inter-Domain Optical Networking, pp. 1-26.*

B. Rajagoplan, J. Liciani, D. Aduche, B. Cain, B. Jamoussi and D. Saha, IP over Optical Networks: A Framework—Second Draft Version, Jun. 6, 2002, Internet Engineering Task Force, pp. 1-41.*

E. Rosen, A. Viswanathan and R. Callon, Multiprotocol Label Switching Architecture, Internet Engineering Task Force, Jul. 2000, pp. 1-63.*

Braun, Guenter, and Khalil, Management of quality of service enabled VPNs, Communications Magazine, IEEE, vol. 39, No. 5, pp. 90-98, May 2001.*

K. Kompella, J. Drake, G. Bernstein, D. Fedyk, E. Mannie, D. Saha, and V. Sharma, OSPF Extensions in Support of Generalized MPLS, Network Working Group—Internet draft: draft-kompella-ospf-gmpls-extensions-02, Jul. 2001, pp. 1-9.*

H. Ould-Brahim, Y. Rekhter, D. Fedyk, E. Rosen, E. Mannie, L. Fang, J. Drake, Y. Xue, R. Hartani and D. Papadimitrio, BGP/GMPLS Optical/TDM VPNs, IETF Draft, Nov. 2001, pp. 1-18.*

Michihiro Aoki et al., "Multilayer Network Architecture no Ichikento", The Institute of Electronics, Information and Communication Engineers 2003 Nen Sogo Taikai Koen Ronbunshu, Tsushin 2-B-9-41, Mar. 3, 2003, Nihon.

Takashi Kurimoto et al., "Multilayer Service Network Architecture no Teian", The Institute of Electronics, Information and Communication Engineers Gijutsu Kenkyu Hokoku, vol. 103, No. 281, PN 2003-6, Aug. 26, 2003, Nihon.

Hisashi Kojima et al., "Multilayer Network ni Okeru Cut Through-Hoshiki no Ichikento", The Institute of Electronics, Information and Communication Engineers 2003 Nen Sogo Taikai Koen Ronbunshu, Tsushin 2-B-6-61, Mar. 3, 2003, Nihon.

Daniel O. Awduche, et al., "Multi-Protocol Lambda Switching: Combining MPLS Traffic Engineering Control With Optical Crossconnects", Apr. 2001.

Eric Mannie, "Generalized Multi-Protocol Label Switching (GMPLS) Architecture", Aug. 2002.

Eric Mannie, "Generalized Multi-Protocol Label Switching Architecture", May 2003.

Rosen, E., et al., "Multiprotocol Label Switching Architecture", Jan. 2001.

Supplementary European Search Report dated May 8, 2008 issued on European patent application 04707288.9.

Rosen, E., et al., "BGP/MPLS VPNs; rfc2547.txt," IETF Standard, Internet Engineering Task Force, IETF (Mar. 1, 1999).

Rajagopalan, Bala, et al., "IP over Optical Networks: A Framework; draft-many-ip-optical-framework-02.txt" IETF Standard-Working-Draft, Internet Engineering Task Force, No. 2, Nov. 24, 2000.

Pendarakis, Dimitris, et al., "Routing Information Exchange in Optical Networks; draft-prs-optical-routing-01.txt" IETF Standard Working Draft, Internet Engineering Task Force, No. 1, Nov. 24, 2000.

Duroyon, Olivier, et al., "Triggering and Advertising Lightpaths in an IP over Optical Network; draft-duroyon-te-ip-optical-00.txt" IETF Standard-Working-Draft, Internet Engineering Task Force, Jul. 1, 2000.

Kompella, Kireeti, et al., "Extension to IS-IS/OSPF and RSVP in Support of MPL(ambda)S; draft-kompella-mpls-optical-00.txt" Standard-Working-Draft, Internet Engineering Task Force, Feb. 1, 2000.

Katz, D., et al., "Traffic Engineering Extensions to OSPF Version 2 * Draft *; draft-katz-yeung-ospf-traffic-09.txt" IETF Standard-Working-Draft, Internet Engineering Task Force, No. 9, Oct. 1, 2002.

Mannie, E., et al., "Extensions to OSPF and IS-IS in Support of MPLS for SDH/SONET Control; draft-mannie-mpls-sdh-ospf-isis-01.txt" IETF Standard-Working-Draft, Internet Engineering Task Force, No. 1, Jul. 1, 2001.

Miyabe, Masatake, et al., "A Study of the GMPLS Control Architecture for IP Photonic Network," Technical Report of IEICE, Dec. 17, 2001, pp. 61-66, vol. 101, No. 508, NS2001-180, PS2001-46, The Institute of Electronics, Information and Communication Engineers, Japan.

Aboul-Magd, Osama, et al., "User Network Interface (UNI) 1.0 Signaling Specification," Oct. 1, 2001, The Optical Internetworking Forum, Contribution No. OIF2000.125.7, Fremont, USA.

Berger, Lou, et al., "Generalized MPLS—Signaling Functional Description," Internet Engineering Task Force (IETF), Aug. 2002, [retrieved online Dec. 2002], Internet URL: http://www.ietf.org/internet-drafts/draft-ietf-mpls-generalized-signaling-09.txt.

Kompella, K., et al., "OSPF Extensions in Support of Generalized MPLS," Internet Engineering Task Force (IETF), Juniper Networks, Dec. 2002, [retrieved online], Internet URL: http://tools.ietf.org/id/draft-ietf-ccamp-ospf-gmpls-extensions-09.txt.

Cornely, Thomas, et al., "Private Network-Network Interface Specification Version 1.1 (PNNI 1.1)," The ATM Forum Technical Committee, Apr. 2002, [retrieved online], Internet URL: ftp://ftp.atmforum.com/pub/approved-specs/af-pnni-0055.001.pdf.

Moy, J., et al., "OSPF Version 2, RFC 2328," IETF, Ascend Communications, Inc., Apr. 1998, [retrieved online], Internet URL: ftp://ftp.rfc-editor.org/in-notes/rfc2328.txt.

Joint Technical Committee ISO-IEC JTC 1, "Information technology—Telecommunications and information exchange between systems—Intermediate System to Intermediate System intra-domain routeing information exchange protocol for use in conjunction with the protocol for providing the connectionless-mode network service (ISO 8473)," International Standard, Nov. 15, 2002, ISO/IEC 10589:2002(E), Second Edition, Geneva, Switzerland.

* cited by examiner

FIG. 3

ROUTING TABLE (IP NETWORK ROUTING TABLE)

| Destination network address | Address mask | Next hop |
|---|---|---|
| xx.xx.xx.x | xxx.x.x.x | xxx.xx.xx.xx |
| x.xx.x.xx | xxx.xxx.xx.x | direct |
| ... | ... | ... |

FIG. 9

| 2031 | 2032 | 2033 | 2034 |
| --- | --- | --- | --- |
| RECEIVING SIDE'S IP ADDRESS | INPUT LABEL VALUE | OUTPUT LABEL VALUE | OUTPUT INTERFACE |
| 100.1.0.0/16 | — | 105 | 5 |
| 100.2.1.0/24 | 100 | — | 1 |
| 100.2.2.0/24 | 345 | — | 2 |
|  |  |  |  |
|  |  |  |  |

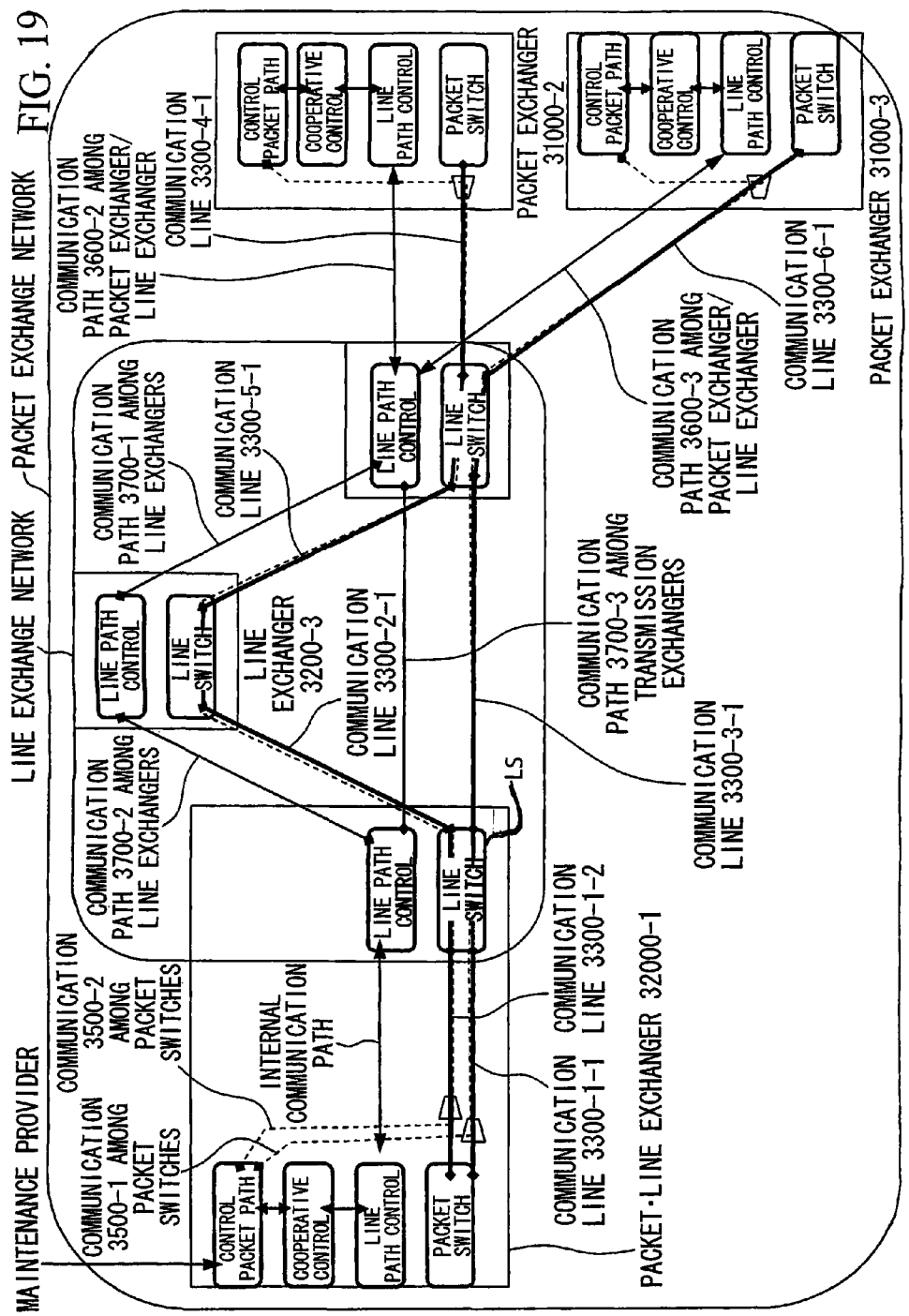

OPTICAL NETWORK, OPTICAL EDGE ROUTER, PROGRAM THEREOF, CUT THROUGH METHOD, AND EDGE ROUTER

TECHNICAL FIELD

The present invention relates to an optical network formed in a plurality of routers and optical cross connects, an optical edge router, and a program therefor.

Also, the present invention relates to a communication method in a core network having connections realized by a light or a layer 2 path. In particular, the present invention relates to a cutting-through method.

Also, the present invention relates to an information transmission network system, a packet exchanger and a packet/line exchanger for transmitting data. In particular, the present invention relates to a technology for establishing transmission lines for transmitting data for realizing the transmission of the data.

BACKGROUND ART

Conventionally, techniques (optical IP techniques) for establishing paths, i.e., TDM (Time Division Multiplexing) channels and wavelengths, by signaling protocols which can be activated in an IP (Internet Protocol) layer have been developed. For the optical IP network models using these techniques, two models, i.e., (1) a peer model represented by prior art document 1, and (2) an overlay model represented by an OIF-UNI (see prior art document 2), have been proposed.

In the peer model in (1), IP addresses, existing in a same address space as external IP networks being connected to an optical network, are used. The peer model is characterized in that a device, i.e., an optical cross connect, can be acknowledged as a node by external IP networks. Therefore, multi-layer cooperative functions, i.e., designating optical paths by using the external IP networks, and establishing the optical paths cooperatively with routing protocols in the external IP networks, can be realized easily.

However, the addresses existing in the same space as the external IP networks are used for controlling the optical paths; therefore, there is a problem in containing a plurality of external IP networks in an optical network.

In the overlay model in (2), an address space for the optical network and an address space for the external IP networks contained there, are independent completely; therefore, topologies and addresses in the optical network are invisible to external IP networks. Therefore, in contrast to the peer model, it is characterized in that, providing multi-layer cooperative functions is difficult, but that it is easy to contain a plurality of networks. Also, in general, in the overlay mode, information regarding paths between the external IP networks are exchanged by passing the routing protocols in the established optical paths; thus, it is necessary to establish/release neighborhood relationships each time the optical paths are established/released. If the neighborhood relationships of the routing operation change, instability increases in the external IP networks because the external IP networks acknowledge that the topologies are being changed in the network.

In general, for carriers, i.e., an applicant having a plurality of IP networks, in terms of efficient use of network resources, i.e., optical fibers, it is very important to multiplex a plurality of IP networks on a single optical network. Also, if multi-layer cooperative functions for controlling the optical paths autonomously are realized in accordance with fluctuations (i.e., updating the routing, and increasing/decreasing traffic amount) in the IP networks, it may reduce operational costs for the carriers.

In addition, if multi-layer cooperative functions are realized, the optical paths are established/released frequently. In terms of safety in the networks, it is desirable that the routing operation in the external IP networks not be affected by the fluctuations of the topologies of the optical paths.

Therefore, new optical IP network models satisfying these requirements are necessary in order to apply the optical IP techniques to backbone networks owned by carriers.

In a core network formed by conventional optical paths or layer 2 paths, an apparatus having pre-installed IP routers as an edge router has additional functions, i.e., GMPLS (for example, see prior art document 3), for setting the optical paths. There are ordinary IP connections (inter-router connections) via these paths among the edge routers. In order to realize direct communications mutually among all of the edge routers, the optical paths or the layer 2 paths must be established in the core network in a mesh manner. Therefore, if the number of the edge routers increases, the number of the paths maintained in an edge router increases; thus, the number of the IP interfaces which the edge router must have increases.

As explained above, if, in terms of scalability, the core network is a large one, the number of the IP interfaces which the edge router must have increases. In general, the IP interfaces are expensive because complicated IP processes, i.e., retrieving the IP addresses, are conducted. Also, such a complication is a bottle neck for increasing interface speeds.

On the other hand, in these core networks, the optical paths are realized by wavelength or logical connection of the layer 2; therefore, number of the connections which can be established by each apparatus is limited. For example, if the optical paths are realized by multiplexing wavelengths, there is a limit due to the number of the wavelength multiplexes in a WDM apparatus. Communication speed with respect to a wavelength is determined by the IP interface speeds in the edge router; therefore, several wavelengths are consumed unless the interface speeds improve. Accordingly, the number of the edge routers which can be contained in the core network is limited due to the limitations of the number of the wavelengths in the WDM apparatus; therefore, it is not possible to facilitate larger scale networks.

There are problems in core networks formed by conventional optical paths or the layer 2 paths in terms of architecture, cost performance, and scalability.

FIG. 11 is a schematic diagram for explaining a conventional data transmission network.

A plurality of line exchangers 3200 are connected by at least a communication line 3300; thus, a line exchange network is formed. A plurality of packet exchangers 3100 are connected to the line exchangers in this line exchange network via the communication lines 3300.

Each of the line exchangers 3200 is formed by a line switch and a section for controlling line paths.

The line switch is connected to a line switch disposed in at least other line exchanger via a plurality of communication lines.

The section for controlling line paths controls the line switch and connects two communication lines. The communication line is, i.e., an optical line, an SDH/SONET line, an ATM line, an MPLS-LSP line, or an FR line. The section for controlling line paths is connected to the line switch disposed in at least one other line exchanger via communication paths 3700 between the line exchangers. The section for controlling line paths exchanges information, i.e., the number of the communication lines for connecting and exchanging the lines mutually, via the communication lines between the line exchangers. It is possible to know the connection relationships in an entire line exchange network by using communication protocols, i.e., OSPF-TE (see prior art document 4) and PNNI (prior art document 5). FIG. 12 is a schematic view for showing connection information among the line exchangers.

Each of the packet exchangers 3100 is formed by a packet switch, a section for setting and controlling lines, and a section for controlling packet lines.

The packet switch is connected to at least the line exchanger 3200 via the communication lines 3300.

The section for setting and controlling lines is connected to at least the packet exchanger/communication lines 3600 among the line exchangers. If parties, i.e., maintenance providers, instruct the packet exchangers 3100 to set new communication lines between two random packet exchangers, the section for setting and controlling lines sends out a message to the line exchangers 3200 to set and control lines. The line exchangers 3200 having received the message for setting and controlling lines, select vacant communication lines necessary for connecting two packet exchangers in accordance with connection-related information in an entire line exchange network in the line exchange network. For example, the communication lines 3300-1-2, 3300-2-1, 3300-5-1, and 3300-4-1 are vacant lines among the packet line exchangers 3100-1 and 3100-2 in accordance with the connection-related information. If these communication lines are connected by the line switches disposed in the line exchangers 3200-1, 2, and 3, it is determined that the communication lines among the packet exchangers 3100-1 and 3100-2 are connectable. In accordance with the determination result, the message for setting and controlling lines is transmitted to other line exchangers. By repeating this, the communication lines are set among the packet exchangers; thus, it is possible to exchange packet data.

The section for controlling packet lines inserts a packet route information message into the communication lines 3300 by a packet insertion/extraction circuit. The inserted packet route information message is transmitted to at least one other section for controlling packet paths via the communication lines. By exchanging the message, it is possible to obtain the connection-related information in a packet communication network mutually. FIG. 13 is a view for showing route information of a packet exchange network. It is possible to determine the paths for transmitting packets in accordance with this route information. The packet exchange network corresponds to networks, i.e., IP packet networks. It is possible to determine the connection relationship of the packet networks and the paths for transmitting packets by using protocols, i.e., the OSPF (see prior art document 6) and the IS-IS protocol (see a prior art document 7). For example, it is determined that the packets transmitted from the packet exchanger 3100-1 to the packet exchanger 3100-3 are transmitted to the communication line 3300-1-1.

FIG. 14 is a schematic diagram for explaining a conventional data transmission network.

A plurality of line exchangers 3200 are connected by at least a communication line 3300; thus, a line exchange network is formed. A plurality of packet exchangers 3100 are connected to the line exchangers in this line exchange network via the communication lines 3300.

Each of the line exchangers 3200 is formed by a line switch and a section for controlling line/packet paths.

The line switch is connected to a line switch disposed in at least one other line exchanger via a plurality of communication lines. The section for controlling packet lines controls the line switch and connects two communication lines. The communication line is, i.e., an optical line, a SDH/SONET line, an ATM line, an MPLS-LSP line, or an FR line.

The section for controlling line/packet paths is connected to the line switch disposed in at least one other line exchanger via communication paths 3700 between the line exchangers.

Each of the packet exchangers 3100 is formed by a packet switch, and a section for controlling line/packet paths.

The packet switch is connected to at least the line exchanger 3200 via the communication lines 3300.

The section for setting and controlling lines/packets is connected to at least the line exchanger 3200 by packet exchanger/communication lines 3600 among the line exchangers.

The section for controlling line/packet path exchanges information, i.e., the number of the communication lines for connecting and exchanging the lines mutually, via the communication paths 3700 among line exchangers. In addition, by exchanging the packet route information messages, it is possible to obtain connection-related information of the packet communication network. It is possible to learn the connection relationship in the entire line exchange network by using communication protocols, i.e., OSPF-TE (see prior art document 4) and a PNNI (see a prior art document 5). Also, it is possible to learn the connection relationship in the packet network mutually by using communication protocols, i.e., the OFPF protocol and the IS-IS protocol. FIG. 15 shows the connection information of a line exchange network and an integrated packet exchange network. It is possible to determine optimum paths for transmitting packets in accordance with this information.

If parties, i.e., maintenance providers, instruct the packet exchangers to set new communication lines between two random packet exchangers, the section for controlling line/packet paths selects the communication lines for connecting two packet exchangers by using the line network information and the packet network information. For example, the communication lines 3300-1-2, 3300-2-1, 3300-5-1, and 3300-4-1 are connected by the line switches disposed in the line exchangers 3200-1, 2, and 3 among the packet exchangers 3100-1 and 3100-2. By doing this, it is determined that the communication lines among the packet exchangers 3100-1 and 3100-2 are connectable. In accordance with the determination results, a message for setting and controlling connected lines is transmitted to the other line exchangers. By repeating this, the communication lines are set among the packet exchangers; thus, it is possible to exchange packet data.

In accordance with the above explained conventional technology, the connection information of the line exchange network and the connection information of the packet exchange network are independent. Therefore, the packet exchanger cannot dispose the communication lines optimally among the packet exchangers by using the information of the line exchange network.

Also, in the other conventional technology explained above, the connection information of the line exchange network and the connection information of the packet exchange network are stored commonly; therefore, the packet exchanger can dispose the communication lines optimally by using the information of the line exchange network. However, there has been a problem in separating the packet transmission network and a network for exchanging and controlling lines in that the packets transmitted from the packet exchangers 3100-1 to 3100-3 have been transmitted to the communication path 3600-1 undesirably.

Prior Art Document 1
Generalized Multi-Protocol Label Switching: "Generalized Multi-Protocol Label Switching Architecture", IETF Internet-Draft, [online], May, 2003, [retrieved July, 2003], Internet<URL HYPERLINK "http://www.ietf.org//internet-drafts/draft-ietf-ccamp-gmpls-architecture-07.txt" http://www.ietforg//internet-drafts/draft-ietf-ccamp-gmpls-architecture-07.txt
Prior Art Document 2
Network Interface, "User Network Interface (UNI) 1.0 Signaling Specification: Changes from OIF200.125.5", The Optical Internetworking Forum, Contribution Number: OIF2000.125.7
Prior Art Document 3
Generalized MPLS-Signaling Functional Description, IETF, [online], August 2002, [retrieved December 2002], Internet "URL:http://www.ietf.org/internet-drafts/draft-ietf-mpls-generalized-signaling-09.txt"
Prior Art Document 4
IETF, "OSPF Extensions in Support of Generalized MPLS", K. K ompella (Editor), Y. Rekhter (Editor), Juniper Networks, December 2002, [online], [retrieved May 23, H-15], Internet "http://www.ietf, org/internet-drafts/draft-ietf-ccamp-ospf-gmpls-extensions-09.txt"
Prior Art Document 5
ATM Forums "Private Network-Network interface Specification Version1.1(PNNI 1.1)", April 2002, [online], retrieved May 23, H15], Internet "ftp://ftp.atmforum.com/pub/approved-specs/af-pnni-0055.001.pdf"
Prior Art Document 6
IETF, "OSPF Version 2, RFC2328", J. Moy, Ascend Communications, Inc., April 1998[online], [retrieved May 23, H15], Internet internet "ftp://ftp.rfc-editor.org/in-notes/rfc2328.txt"
Prior Art Document 7
ISO, "Intermediate System to Intermediate System, DP 10589"

DISCLOSURE OF THE INVENTION

An object of the present invention is to provide an optical network, etc. for realizing a multi-layer cooperative function having high stability in the network.

The invention for solving the above problems is an optical network system. This optical network system comprises: sections for establishing optical paths; a plurality of optical edge routers for connecting external IP networks to the optical network; and a plurality of optical cross connects, for connecting the optical edge routers by the optical paths, having switching sections with respect to an optical pulse unit.

In addition, the present invention is characterized in that each of the optical edge router has both of: (1) an optical network control instance for maintaining topology information in the optical network and switching/signaling the optical paths; and (2) an IP network instance for maintaining a routing table in each of the external IP networks and activating routing protocols between the external IP networks and the IP network instance.

The "sections for establishing optical paths" have a function for establishing paths for the optical signals. An RSVP-TE of the GMPLS corresponds to the sections for establishing optical paths in embodiments which will be explained later. The "optical edge routers" have a function for connecting the external IP networks and the optical network. By this function, more specifically, IP packets (ingress-side IP address) to be processed correspond to the optical paths so that the IP packets are relayed to appropriate optical paths. An "optical cross connect device (optical core router)" switches paths (optical paths) of the optical signals by switching the optical signals.

In general, the "optical paths" indicate paths, formed with respect to a wavelength unit, for optical signals. In the present invention, they contain channels, i.e., TDM (SONET.SDH [Synchronous Optical NETwork/Synchronous Digital Hierarchy]). In addition, the wavelengths and the TDM channels can be handled in a similar manner in the above explained GMPLS protocol.

"Topology information in the optical network" indicates information about, i.e., what kind of interfaces are contained in apparatuses forming the optical network, and what kind of address is allocated in the apparatuses.

"Signaling" indicates communications, i.e., specifying counterparts, and monitoring/requesting conditions in either one of the apparatus with each other. Also, "signaling protocols" are used for the communications above.

By doing this, the address space in the external IP network and the address space used for controlling the optical network are separated completely; thus, it is possible to contain a plurality of IP networks in a single optical network. In addition, since an edge router has both of the instances, it is possible to control the optical paths integrally by using information about the external IP networks; that is, multi-layer cooperation is available.

Instances indicate data as actual values based on classes with respect to object-oriented-programming. It is frequently used in contrast to the class; therefore, the class is explained as a "type", and the instance is explained as "reality".

Also, the optical network system of the present invention is characterized in that, in the optical network, the routing protocols, for exchanging route information among the external IP networks, are activated among the optical network control instances in the edge router to which the external IP networks are connected.

By doing this, the external IP networks may acknowledge as if neighboring routing relationship for exchanging route information in the external IP networks is always established among the optical edge routers. This neighboring routing relationship is not affected by fluctuations of the topologies in the optical paths; therefore, the external network may acknowledge as if the topologies are always stable.

Also, the optical network system of the present invention is characterized in that, in the optical network system, BGPs (Border Gateway Protocols) are used for protocols for exchanging the route information of the external IP networks.

The BGPs are protocols for exchanging information about IP paths between different networks. In the embodiments which will be explained later, the BGPs are used for communicating the route information among the optical edge routers without modifying the BGPs.

Because of the BGPs, as a standard protocol, used in the IP networks commonly, it is possible to avoid costs for developing the protocols.

Also, the present invention is an optical edge router for transmitting packets between the edge routers and the external IP networks. This optical edge router comprises: a section for transmitting packets between neighboring routers in the external IP networks; a section for exchanging route information between the neighboring routers; a section for producing routing tables and storing the same in a storage section; a section for collecting topologies inside the optical networks and storing the same in the storage section; a section for signaling so as to establish/release the optical paths; a section for notifying route information to other optical edge routers which face the optical edge router; and a section for reading out the routing tables and the topology information from the storage section and producing packet forwarding tables which set where the packets are to be transmitted in the section for transmitting the packets.

In the embodiments which will be explained later, the section for transmitting packets corresponds to a transmitting processing section. The section for exchanging route information corresponds to an IP network routing protocol processing section. The section for producing routing table corresponds to an IP network routing protocol processing section. This section for storing the produced routing table corresponds to a section for storing IP network routing tables. A section for collecting topology information corresponds to an OSPF-TE processing section. The section for signaling corresponds to an RSVP-TE processing section. The section for notifying paths information corresponds to the BGP processing section. A section for storing topology information corresponds to an optical network topology DB.

Also, the present invention is a program, used for optical networks and optical edge routers having sections for predetermined calculations, and sections for transmitting packets between a section for predetermined calculations and external IP networks. This program is executed by the section for the predetermined calculations, and the section for the predetermined calculations comprises functions of: exchanging route information; producing a routing table; collecting topology information; signaling; notifying route information; and producing a packet forwarding table.

Also, another object of the present invention is to provide a cutting-through method and an edge router for reducing the cost of the edge router and improving the scalability by omitting a part of the IP processing operation in the edge routers.

The present invention is a cutting-through method for direct communication by a plurality of edge routers for connecting a core network and a plurality of external IP networks mutually at border points of the core network and the external IP networks.

The present invention is characterized in that, lists are maintained in which ingress-side IP addresses correspond to identifiers for showing outgoing interfaces of egress edge routers, in ingress edge routers; the identifiers, corresponding to the ingress-side IP addresses, are added to the IP packets by the ingress edge routers when IP packets are transmitted; and the IP packets are transmitted to the outgoing interfaces by referring to the identifiers added to the IP packets in the egress edge routers.

According to the present invention, IP addresses are retrieved only by an interface near the external IP networks in the ingress edge router in contrast to the conventional retrieving of IP addresses by the edge routers on both side's of the core network. By doing this, it is possible to omit complicated IP processing operations by the interface near the external IP networks in the edge router; thus, it is possible to limit the IP address retrieval to simple processes, i.e., referring to identifiers. By doing this, it is possible to reduce the cost of the interface near the core network in the edge router. In addition, because the interface speed may be increased by the simple processes, it is possible to reduce the number of the paths in the core network by increasing the speed with respect to a path; thus, it is possible to improve scalability.

It is preferable that that MPLS labels should be used for the identifiers. According to the present invention, it is possible to use elemental functions, i.e., tables for managing the MPLS labels (MPLS label tables), and capsulation hardware for adding the MPLS labels to the IP packets and removing them therefrom, for supporting existing MPLSs; thus, it is possible to reduce the cost for development.

It is preferable that correspondence information with respect to the ingress-side IP addresses and corresponding identifiers be exchanged among the edge routers by control signals. According to the present invention, the edge router exchanges the information necessary to generate the lists in which the ingress-side IP addresses correspond to the identifiers automatically; therefore, it is possible to omit manual-setting processes; thus, it is possible to reduce operational costs of the network.

The present invention is an edge router comprising: inputting sections for connecting a core network and a plurality of external IP networks at its border points mutually and handling incoming IP packets, inputted from the external IP networks, to the core network; and outputting sections for handling outgoing IP packets outputted from the core network to the external IP networks.

The present invention is characterized in that the inputting sections have: a section for maintaining lists, in which ingress-side IP addresses correspond to identifiers for showing outgoing interfaces of other egress edge routers; and a section for adding the identifiers corresponding to the ingress-side IP addresses of the IP packets to the IP packets, in accordance with the lists when the IP packets are transmitted to other edge routers. Also, it is characterized in that the outputting section has a section for referring to the identifiers and transmitting the IP packets to the outgoing interfaces, indicated by the identifiers.

The present invention can realize edge router device for implementing the cutting-through method in which the ingress-side IP addresses are retrieved by only the ingress edge router, and the outgoing interface is determined by only retrieving the identifiers.

It is preferable that that MPLS labels should be used for the identifiers. According to the present invention, it is possible to use elemental functions, i.e., tables for managing the MPLS labels (MPLS label tables), and capsulation hardware for adding the MPLS labels to the IP packets and removing them therefrom, for supporting existing MPLSs; thus, it is possible to reduce the cost for development.

It is preferable that the edge router should further comprise a section for exchanging information, in which the ingress-side IP addresses correspond to the identifiers, among other edge routers mutually by control signals. Also, it is preferable that the section for maintaining the lists have a section for generating or updating the lists in accordance with the information obtained by the exchanging section with respect to the correspondence information between the ingress-side IP addresses and the identifiers.

According to the present invention, the edge router exchanges the information necessary to generate the lists in which the ingress-side IP addresses correspond to the identifiers automatically; therefore, it is possible to omit manual-setting processes; thus, it is possible to reduce operational costs of the edge router.

The present invention is a program, installed to an information processing apparatus, for realizing functions corresponding to edge routers, the functions being inputting functions, for connecting a core network and a plurality of external IP networks at border points mutually and handling incoming IP packets inputted from the external IP networks to the core network; and outputting functions, for handling outgoing IP packets outputted from the core network to the external IP networks.

The present invention is characterized in that the inputting functions serve for: a function for maintaining lists in which ingress-side IP addresses correspond to identifiers for showing outgoing interfaces of other egress edge routers; and a function for adding the identifier corresponding to the ingress-side IP addresses of the IP packets to the IP packets in accordance with the lists when the IP packets are transmitted to other edge routers. Also, it is characterized in that the outputting function serves for referring to the identifiers and transmitting the IP packets, indicated by the identifiers, to the outgoing interfaces. It is preferable that that MPLS labels should be used for the identifiers.

Also, it is preferable that the program further comprise a function for exchanging information, in which the ingress-side IP addresses correspond to the identifiers, among other edge routers mutually by the control signals. Also, it is preferable that the function for maintaining the lists serve for generating or updating the lists in accordance with the information obtained by the exchanging section with respect to the correspondence information between the ingress-side IP addresses and the identifiers.

The present invention is a recording medium, readable by the information processing apparatus, on which the program according to the present invention is recorded. The program according to the present invention is recorded on the recording medium according to the present invention; therefore, the program can be installed to the information processing apparatus by this recording medium. Otherwise, the program according to the present invention can be installed to the information processing apparatus directly from a server maintaining the program according to the present invention via a network.

By doing this, a part of the IP processes in the edge router is omitted by using the information processing apparatus, i.e., a computer, and it is possible to realize a cutting-through method and the edge router for reducing the cost of the edge router and improving scalability.

The present invention is an information transmission network system, having a plurality of line exchangers and a plurality of packet exchangers, for setting communication lines among the packet exchangers, the line exchangers and the packet exchangers being connected by the communication lines. In the present invention, the line exchanger has a line switch and a section for controlling line paths. The line switch has a function for connecting the communication lines, connected to the line exchangers, arbitrarily. Each of the packet exchangers, connected to the line exchangers, has a packet switch, a section for controlling line paths, a section for controlling packet paths, and a cooperative control section. The packet switch has functions for selecting the communication lines for transmission and outputting the same in accordance with packet-ingress-side's information transmitted via the communication lines. The section for controlling line paths in the line exchanger is connected to the section for controlling line paths in other line exchangers via lines among line exchangers. The section for controlling line paths in the packet exchanger is connected to at least the section for controlling line paths in the line exchangers via lines among the packet exchangers and the line exchangers. The section for controlling line paths in the line exchanger and the section for controlling line paths in the packet exchanger have a function for acknowledging line connection conditions in a communication network, by exchanging information of the communication condition among the communication lines. The section for controlling packet paths acknowledges connection-related-information with respect to packet exchange among the packet exchangers connected via the communication lines, by exchanging the information for the packet paths via the communication lines, and determines the communication lines for output in accordance with the packet-ingress-side's information. The cooperative control sections have functions for receiving instructions regarding new communication lines, referring to two information, i.e., connection information, with respect to line-exchanging-network, collected by the section for controlling line paths, and connection information with respect to packet-exchange collected by the section for controlling packet paths, selecting paths used for the new communication lines, and instructing the section for controlling line paths to set paths being used for the new communication lines. The section for controlling line paths has functions for transmitting messages to the line exchangers to set up lines in accordance with the instructed paths so that the line exchangers, receiving the messages for controlling and setting the connected lines, set up the communication lines, and sending control messages to the line exchangers for setting the lines in accordance with the instructed paths.

The present invention is an information transmission network system for setting the communication lines among the packet exchangers and among the packet exchangers and the line exchangers, having packet/line exchangers in which the packet exchangers and the line exchangers are integrated.

The present invention is a packet exchanger in an information transmission network system, having a plurality of line exchangers and a plurality of packet exchangers, for setting communication lines among packet exchangers, comprising: a packet switch having a function for selecting communication lines used for transmittance, in accordance with the packet-ingress-side's information transmitted, by the communication lines and outputting the same; at least a section for controlling line paths in the line exchangers, connected to the communication lines among the packet exchangers/line exchangers, for exchanging connection information of the communication lines and acknowledging line connection conditions in a communication network; a section for controlling packet paths having functions for acknowledging connection-related-information with respect to packet exchange by exchanging information of the packet paths via the communication lines among the packet exchangers connected via the communication lines, and determining the communication lines for output; and a cooperative control section having a function for receiving instructions by new communication lines, referring to two pieces of information, i.e., connection information, with respect to the packet exchange, collected by the section for controlling line paths, and connection information with respect to the packet exchange collected by the section for controlling packet paths, selecting paths used for the new communication lines, and instructing the section for controlling line paths to set paths used for the new communication lines. In the present invention, the section for controlling line paths has functions for transmitting messages to the line exchangers to set up lines in accordance with the instructed path so that the line exchangers, receive the messages for controlling and set the connected lines, set up the communication lines, and send control messages to the line exchangers for setting the lines in accordance with the instructed paths.

The present invention is a packet/line exchanger in an information transmission network system, having a plurality of line exchangers and a plurality of packet exchangers, for setting communication lines among packet exchangers, comprising: line switches, connected to the line exchangers, having a function for connecting the communication lines arbitrarily; a packet switch having a function for selecting communication lines used for transmittance, in accordance with the packet-ingress-side's information transmitted, by the communication lines and outputting the same; at least a section for controlling line paths in the line exchangers, connected to the communication lines among the packet exchangers/line exchangers, for exchanging connection information of the communication lines and acknowledging line connection conditions in a communication network; a section for controlling packet paths having functions for acknowledging connection-related-information with respect to packet exchange by exchanging information of the packet paths via the communication lines among the packet exchangers connected via the communication lines, and determining the communication lines for output; and a cooperative control section having function for receiving instructions by new communication lines, referring to two pieces of information, i.e., connection information, with respect to the packet exchange, collected by the section for controlling line paths, and connection information with respect to the packet exchange collected by the section for controlling packet paths, selecting paths used for the new communication lines, and instructing the section for controlling line paths to set paths being used for the new communication lines. In the present invention, the section for controlling line paths, has functions for, transmitting messages to the line exchangers to set up lines in accordance with the instructed path, instructed by the cooperative control section, so that the line exchangers, receiving the messages for controlling and setting the connected lines, setting up the communication lines, and sending control messages to the line exchangers for setting the lines in accordance with the instructed paths.

BRIEF DESCRIPTION OF DRAWINGS

FIG. 3 is an example for IP network routing table in the embodiments.

FIG. 9 a view explaining an MPLS label table.

FIG. 10 is a view for explaining the structure of the edge routers for realizing the optical cut-through.

FIG. 19 is a view for explaining a fourth embodiment of the present invention.

BEST MODE FOR CARRYING OUT THE INVENTION

First Embodiment

A first embodiment for implementing the present invention will be explained in detail with reference to drawings.

Figure 1:
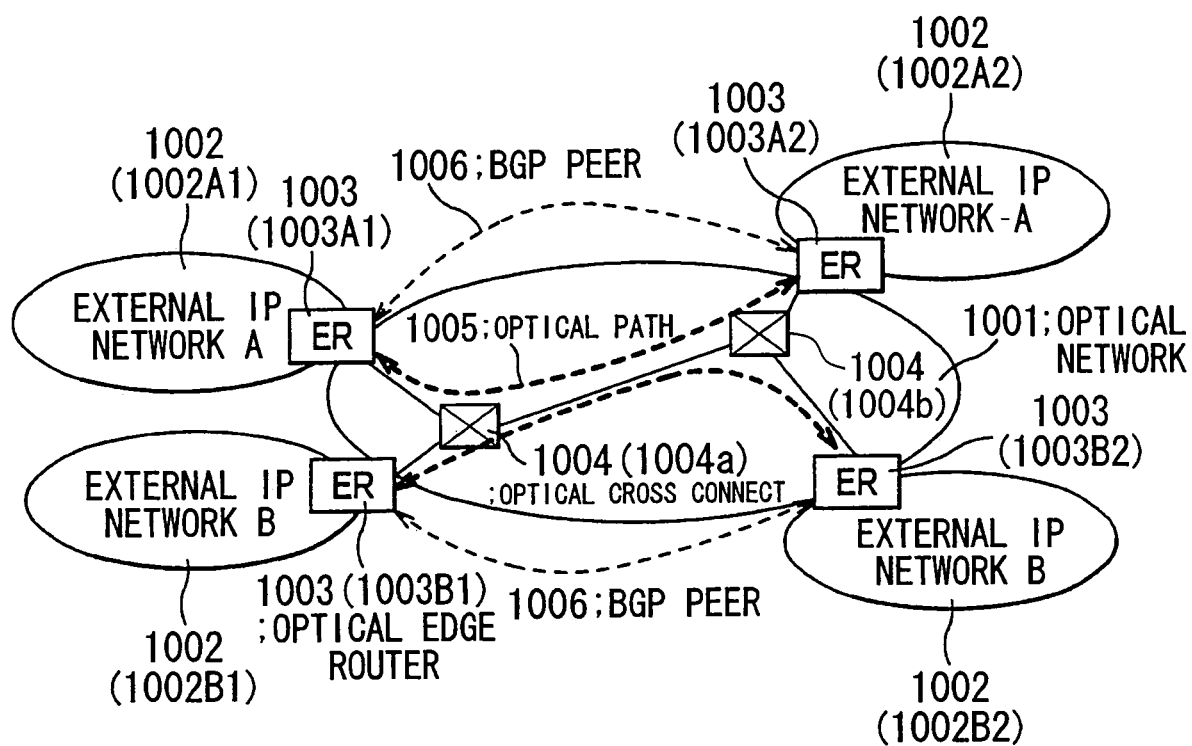
FIG. 1 is a view showing a general structure of an optical network including external IP networks in the embodiments.

FIG. 1 is a view showing a general structure of an optical network including external IP networks.

As shown in FIG. 1, an optical network 1001 includes two sets of external IP networks 1002A and 1002B1, consisting of, i.e., totally 4 (four) sites: 1002A1, 1002A2, 1002B1, and 1002B2. The external IP networks 1002A2 and 1002B2 are contained in the optical network 1001 via edge routers 1003 so that an optical path 1005 is established among the optical edge routers 1003 through optical cross connects (optical cross connect device) 1004 (1004a, 1004b . . . ). Also, BGP peers 1006 are established among the optical edge routers 1003 for exchanging route information of the external IP networks. GMPLS is used for a protocol for controlling the optical paths in the optical network.

The GMPLS, used in the present embodiment, is a technique for routing signals on the optical IP network 1001. Routing paths have conventionally been designated by adding labels to packets in a conventional MPLS (Multi-Protocol Label Switching). In contrast, in the GMPLS, the routing paths are determined based on wavelengths in optical signals, and actual data are routed as a non-modified optical signals by preparing IP channels used for controlling exclusively. In the routing, the optical signals are not converted to electric signals; therefore, the routing can be done at a high speed.

The BGP peers 1006 are established among the optical edge routers 1003 so as to exchange information by a protocol BGP. The BGP is a one-for-one protocol. Steps for establishing the BGP peers 1006 consists of, in order, i.e., (1) establishing a three-way-handshake connection by TCP, (2) transmitting an OPEN message, and (3) returning a KEEPALIVE message. When the BGP peers 1006 are established, information is exchanged, i.e., the routing table (see table 3 which will be explained later) is exchanged, route information is updated by an UPDATE message, and the KEEPALIVE message is exchanged periodically.

In the present specification, with respect to reference numerals of the external IP network 1002, if it is explained as a superordinate concept, a reference numeral 1002 is used simply. If it is explained individually and specifically, reference numerals 1002A, 1002b, 1002A1, 1002A2, 1002B1, and 1002B2 are used. The optical edge routers 1003 are understood similarly. That is, if it is explained as a superordinate concept, a reference numeral 1003 is used. If it is explained individually and specifically, reference numerals 1003A, 1003b, 1003A1, 1003A2, 1003B1, and 1003B2 are used. Also, instances INS are understood similarly. That is, if it is explained as a superordinate concept, a reference symbol INS is used. If it is explained individually and specifically, reference symbols INSi and INSp. The other reference numerals and symbols are understood similarly to the reference numerals 1002 and 1003, etc.

Figure 2:
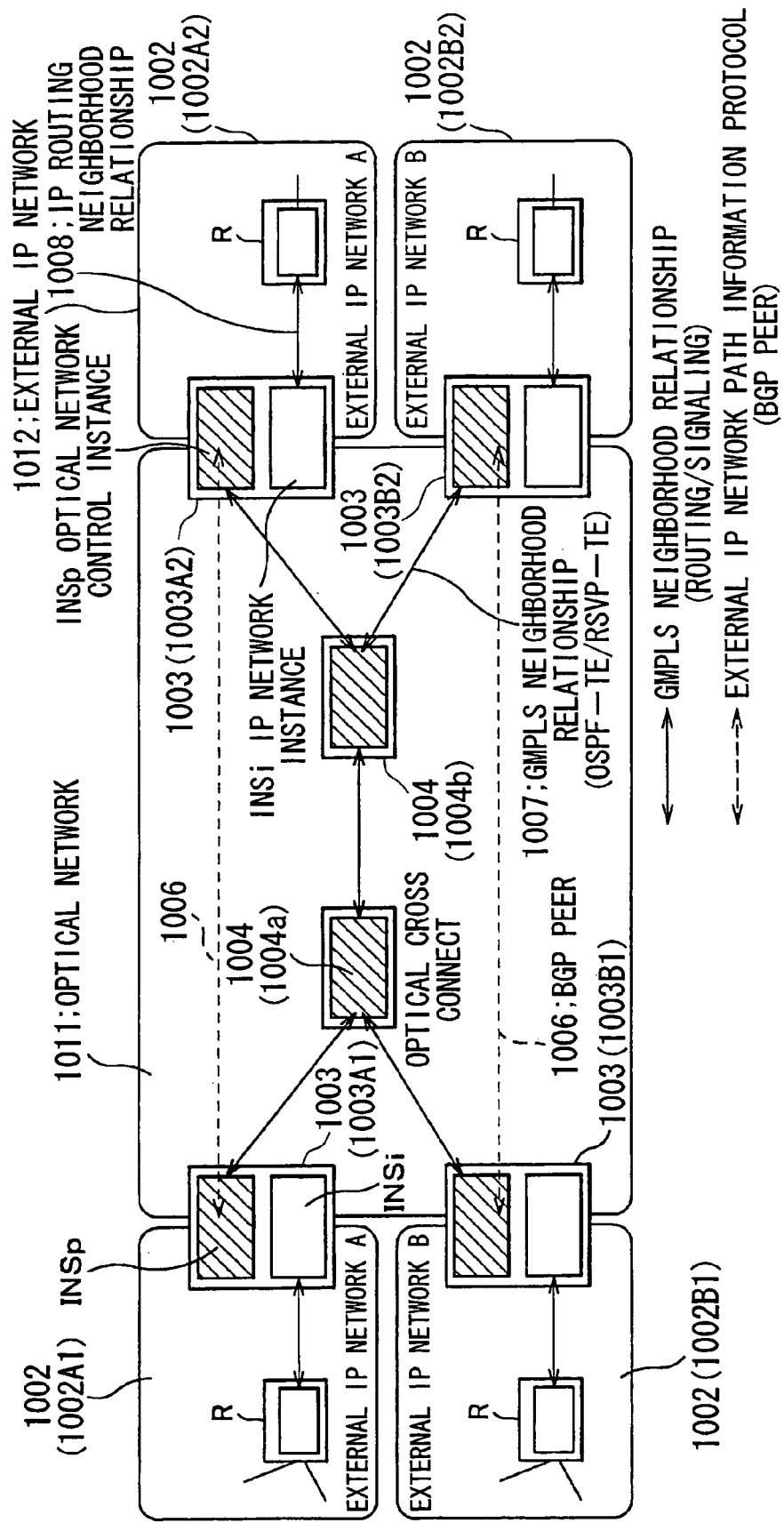
FIG. 2 is a view showing a neighboring relationship between instances and routings maintained by nodes on the optical network.

FIG. 2 is a view showing a neighboring relationship between instances and routings maintained by nodes on the optical network. As shown in FIG. 2, similarly to the case of FIG. 1, an optical network 1011 contains two sets of external IP networks 1002A and two sets of 1002B, consisting of, i.e., totally 4 (four) sites: 1002A1, 1002A2, 1002B1, and 1002B2. The external IP networks 1002 (1002A1, 1002A2, 1002B1, 1002B2) are contained in the optical network 1011 via the optical edge routers 1003 (1003A1, 1003A2, 1003B1, 1003B2). The optical edge routers 1003 are connected by the optical cross connects 1004 (1004a, 1004b . . . ). Also, the external IP network is formed by an ordinary IP router R (called "neighboring IP router R" adequately).

Next, nodes (optical edge routers 1003, optical cross connects 1004) are explained as follows.

Each of the optical edge routers 1003 has both an optical network control instance INSp and an IP network instance INSi.

The optical network control instance INSp activates routing protocols and signaling protocols for controlling optical paths 1005 in the optical network 1001 and maintains topology information, obtained by them, inside the optical network 1011. If the GMPLS is used for controlling the optical network, OSPF-TE (Open Shortest Path First-TE) is activated as a routing protocol, and RSVP-TE (Resource reservation Protocol-TE) is activated as a signaling protocol. OSPF-TE is obtained by enlarging OSPF, which is a kind of path-selecting (routing) protocol, so that property information (i.e., resource amount) in the external IP networks 1002 can be notified. The RSVP-TE for establishing label paths along designated paths is enlarged currently so that the optical paths 1005 (see FIG. 1) can be established, too.

The IP network instance INSi exchanges route information of the external IP networks among the IP network instance INSi and the external IP networks 1002, and generates a routing table (hereinafter called "IP network routing table") of the external IP network 1002 as shown in FIG. 3. As shown in FIG. 3, the IP network routing table contains information, i.e., a prefix (destination network address) of a ingress-side IP address, an address mask, and a next hop. In general, the routing table is initialized when the routers are set up. Also, the routing table is updated because, i.e., the topology fluctuates, and the paths are changed due to the routers. The optical edge routers 1003 and the IP network routing table according to the present embodiment are similar to ordinary routers and an ordinary routing table.

Each of the optical edge routers 1003 maintains both of the instances INSp and INSi; therefore, it is possible to control the optical paths 1005 autonomously by triggers, i.e., updating route information of the external IP networks in the external IP networks 1002, and increase in the traffic amount.

Figure 4:
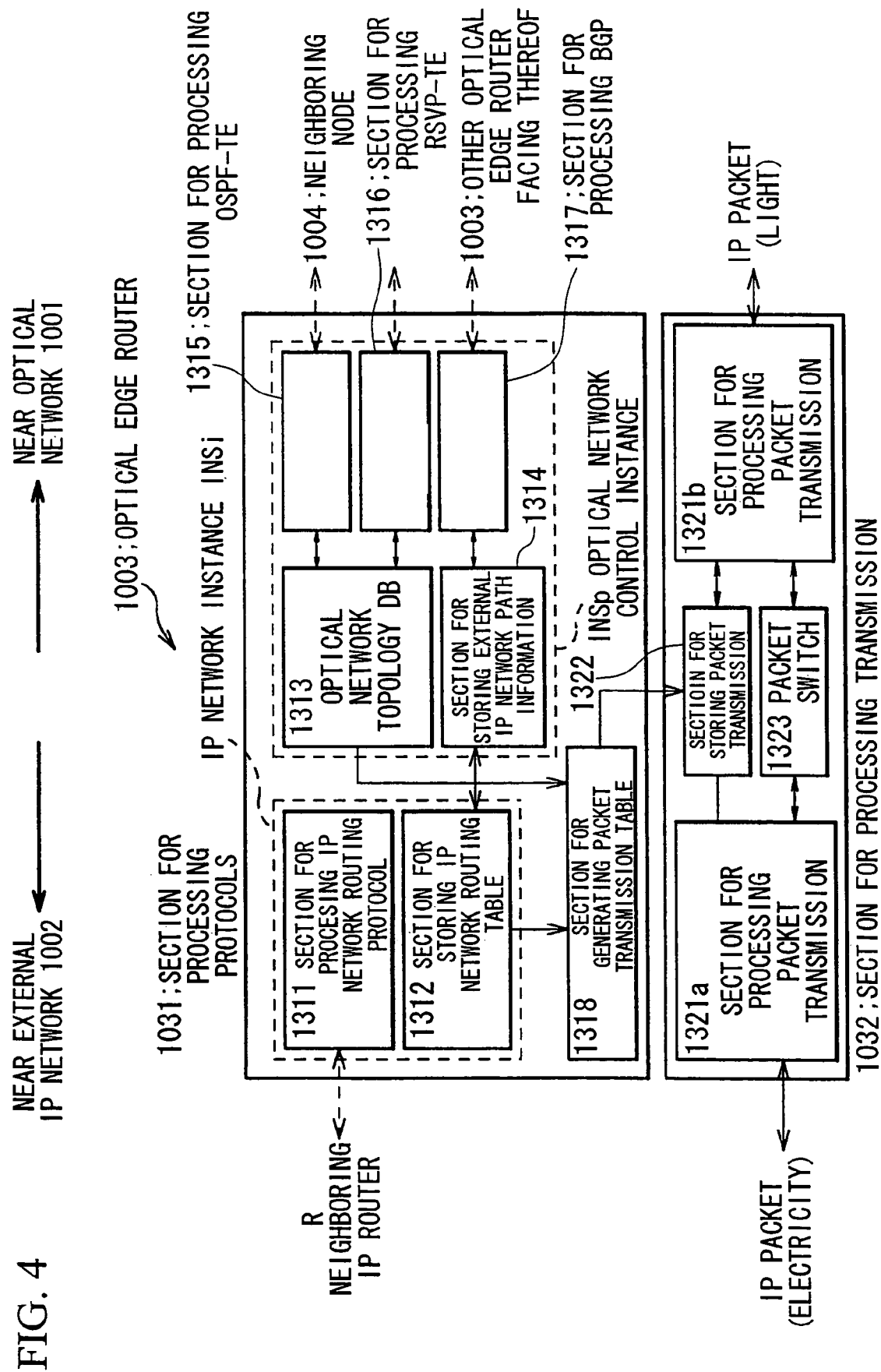
FIG. 4 is a function block diagram showing a more specific structure of the optical edge router in the embodiments.

FIG. 4 is a function block diagram showing a more specific structure of the optical edge router in the embodiments. The optical edge routers 1003 (1003A1, 1003A2, 1003B1, 1003B2) in the present embodiment will be explained with reference to FIG. 4.

As shown in FIG. 4, each of the optical edge routers 1003 includes a section 1031 for processing protocols (section for processing calculations) in which software-like processes are executed and a section 1032 for processing transmission in which hardware-like processes are executed. The section 1031 for processing protocols has the above explained IP network instance INSi and the above explained optical network control instance INSp.

The IP network instance INSi has a section 1311 for processing IP network routing protocol according to which the routing protocols, for exchanging route information of the external IP networks between the section 1311 and neighboring nodes (ordinary IP router R) in the external IP networks 1002, are activated, and a section 1312 for storing IP network routing tables (see FIG. 3) produced by the routing protocol.

Incidentally, the IP network routing tables are produced by either one of processes in which, i.e., route information received from the external IP networks 1002 is input by the section 1311 for processing IP network routing protocol, or the route information maintained in a section 1314 for storing route information of the external IP networks is input. In addition, in the optical edge router 1003 (1003A1), route information near the external IP network 1002 (near reference numeral 1002A1) is received by the section 1311 for processing IP network routing protocol and input into the section 1314 for storing route information of the external IP networks. On the other hand, in the other site (near reference numeral 1002A2), the route information is received by the section 1317 for processing BGP via the (facing) optical edge router 1003 (1003A2) and input into the section 1314 for storing route information of the external IP networks. OSPF and BGP can be used for the routing protocols.

Also, the optical network control instance INSp is provided with a section 1315, for processing OSPF-TE and collecting topology information (and resource information regarding the number of wavelengths in a link, etc.) in the optical network 1001 from the neighboring node (i.e., optical cross connect 1004), and a section 1316 for processing RSVP-TE and signaling so as to establish/release the optical path 1005. Operations in these two sections 1315 and 1316 are conducted in accordance with standard operations defined by the GMPLS.

In addition, the optical network control instance INSp is provided with a section 1317 for processing BGP and notifying route information (the same contents in the above explained route information of the IP network routing table) of the external IP networks to the other facing optical edge routers 1003. The section 1317 for processing BGP also has a function for receiving notification in a reverse direction, i.e., route information of the external IP networks notified from the facing other optical edge routers 1003.

Reference numeral 1313 indicates an optical network topology DB for storing topology information collected by the section 1315 for processing OSPF-TE. The optical network topology DB 1313 stores/reads out information between the section 1313 and the section 1316 for processing RSVP-TE. Also, reference numeral 1314 indicates a section for storing route information of the external IP.

Incidentally, in the present embodiment, the section 1031 for processing protocols is provided with a section 1318 for generating a packet forwarding table and setting the transmission of received IP packets in accordance with an IP network routing table stored in the section 1312 for storing IP network routing tables and the topology information of the optical network 1001 stored in the optical network topology DB 1313.

On the other hand, the section 1032 for processing transmission is provided with sections 1321a and 1321b for processing packet transmission, a section 1322 for storing packet forwarding table, and a packet switch 1323. By the structure in the section 1032 for processing transmission, processes are executed, i.e., electric signal IP packets are converted to optical signal IP packets, and in contrast, the optical signal IP packets are converted to the electric signal IP packets, and paths of the IP packets are switched by the packet switch 1323 and transmitted.

The transmission of the packets, and the IP routing table transmission table, and the IP routing packet forwarding table, are explained additionally.

In an ordinary large-scale router, the section 1032 for processing packet transmission is built in an interface card (also called a line card). This interface card includes, in order, an optical line (optical fiber)—a section for ending optical signals (optical signals↔electric signals)—sections 1321 for processing packet transmission (determining next hop by retrieving IP addresses)—and a packet switch 1323. At present, optical fibers are mainly used for lines; therefore, the signals output to the external IP networks 1002 are the optical signal IP packets (and converted into the electric signals later). Therefore, sections 1321*a* and 1321*b* for processing packet transmission have the same structure as each other. A converting section for converting the optical signals and the electric signals alternately, not shown in the drawings, exists between the section 1321*a* for processing packet transmission disposed near the external IP network 1002 and the external IP network 1002.

With respect to both of the tables, the IP network routing table has information, as shown in FIG. 3, in accordance with routing protocol type activated between the neighboring IP router R disposed near the external IP network 1002 and the table 1312. In contrast, in general, the packets are transmitted in a hardware-like manner; therefore, a table for transmitting packets has simplified information so that the hardware can acknowledge it.

Next, the optical cross connect 1004 maintains only the optical network control instance INSp; thus, the optical cross connect 1004 does not have the IP network instance INSi. Therefore, the optical cross connect 1004 does not exchange the route information (route information in the external IP network) with the external IP network 1002 at all, and instead, the optical cross connect 1004 only controls inside of the optical network 1001.

Figure 5:
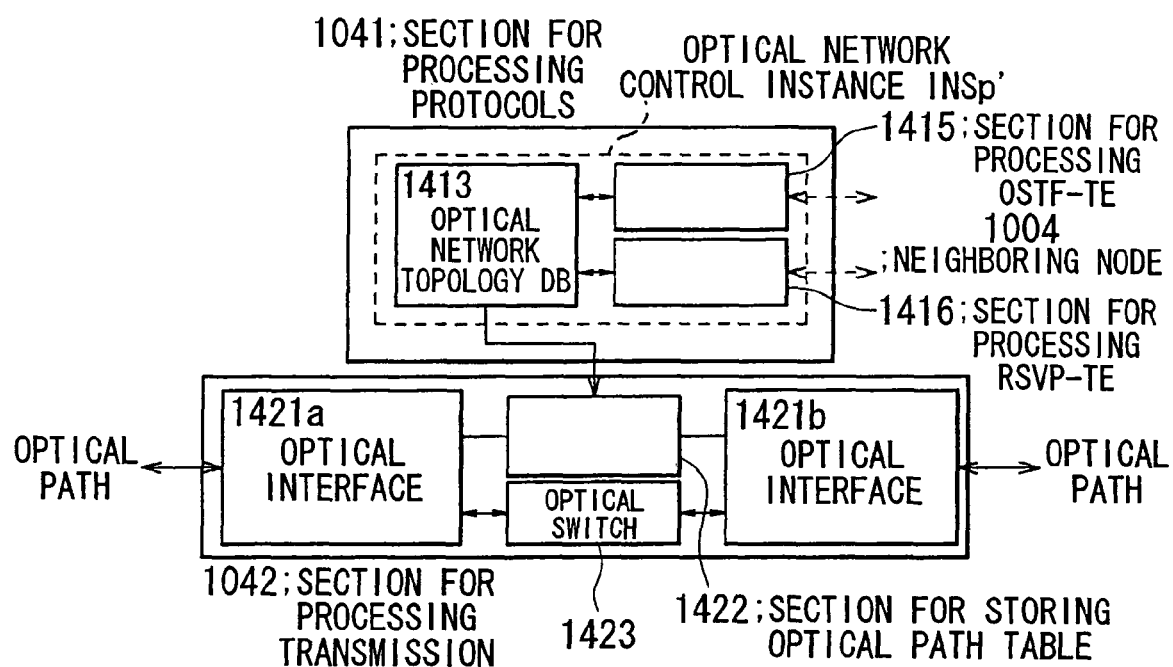
FIG. 5 is a function block diagram showing a more specific structure of the optical cross connects in the embodiments.

FIG. 5 is a function block diagram showing a more specific structure of the optical cross connects in the embodiments. The optical cross connects 1004 (1004*a*, 1004*b* . . . ) according to the present embodiment are explained with reference to FIG. 5.

As shown in FIG. 5, the optical cross connect 1004 includes a section 1041 for processing protocols and a section 1042 for processing transmission similarly to the above explained optical edge router 1003 (see FIG. 4). Also, the section 1041 for processing protocols is provided with the optical network control instance INSp'.

The optical network control instance INSp' is provided with the optical network topology DB 1413, the section 1415 for processing OSPF-TE, and the section 1416 for processing RSVP-TE. Explanations for these sections are omitted because these section have approximately the same functions as those in the above explained optical edge router 1003 (The optical network topology DB 1413=the optical network topology DB 1313, the section 1415 for processing OSPF-TE=the section 1315 for processing OSPF-TE, and the section 1416 for processing RSVP-TE=the section 1316 for processing RSVP-TE). The neighboring node 1004 in FIG. 4 indicates the other optical edge routers 1004 or the other nodes (i.e., switches).

The section 1042 for processing transmission is provided with optical interfaces 1421*a* and 1421*b*, a section 1422 for storing an optical path table, and an optical switch 1423. The optical path 1005 is switched by this structure of the section 1042 for processing transmission. A relationship in which entrance port numbers, set by the RSVP-TE signal when the optical paths are established, correspond to exit port numbers is maintained in the optical path table stored in the section 1422 for storing optical path table; thus, the optical switch 1423 sets the lines (optical path 1005) in accordance with the correspondence relationship.

Next, the neighborhood relationship of the routing protocol between the instances INS, and information exchange are explained.

An ordinary IP routing neighborhood relationship 8 is established between the optical edge router 1003 and the neighboring IP router R disposed in the external IP network 1002. Route information (route information in the external IP network) is exchanged. More specifically, the optical edge router 1003A1 receives the route information in the external IP network 1002A1 from the external IP network 1002A1 and notifies the route information received from the optical edge router 1003A2 to the external IP network 1002A1.

The BGP peer 1006 is established between the optical edge routers 1003 so that each of the optical edge routers 1003 exchanges the route information in the external IP network, the route information being received from the external IP network 1012. The BGP peer 1006 is established between the optical network control instances INSp in each one of the optical edge routers 1003. The route information in the external IP network belongs to the external IP network 1002.

That is, each one of the optical edge routers 1003 passes (notifies) the route information in the external IP network maintained in the IP network instance INSi to the optical network control instance INSp and notifies to the optical edge router 1003 facing the same via the BGP peer 1006. The BGP peer 1006 is established only between the optical edge routers 1003 for containing sites belonging to the same external IP network 1002. With respect the same external IP networks 1002, as shown in FIGS. 1 and 2, the external IP network 1002A1 and 1002A2 are the same as each other, and the external IP network 1002B1 and the external IP network B2 are the same as each other.

The optical network control instance INSp establishes a neighboring node in the optical network 1001 and GMPLS neighborhood relationship 1007. More specifically, the optical network control instance INSp establishes a neighborhood relationship of the OSPF-TE as a routing protocol in the GMPLS and exchanges the topology information in the optical network 1001. Also, when the optical path 1005 is established/released, the message for signaling RSVP-TE is transported via the neighborhood relationship between the optical network control instance INSp.

All the optical network control instances INSp in the optical network 1001 are connected by the GMPLS neighborhood relationship 1007. In contrast, the BGP peer 1006 for exchanging the route information in the external IP network 1002 is not established between IP network instances INSi containing different external IP networks 1002. Therefore, the optical network control instances INSp are used commonly in all of the external IP networks for containing the optical network control instances INSp. The IP network instances INSi are independent with respect to each one of the external IP networks 1002. For example, the optical edge router 1003A1 for containing the external IP networks 1002A establishes the BGP peer 1006 between the optical edge router 1003A2 and the optical edge router 1003A1. However, the optical edge router 1003A1 does not establish the BGP peer 1006 among the optical edge router 1003A1, the optical edge router 1003B1 for containing the external IP networks 1002B, and the optical edge router 1003B2. In this way, the optical network control instances INSp for controlling the optical path 1005 and the IP network instances INSi for exchanging the route information in the external IP networks 1002 are separated in the optical edge router 1003. By doing this, it is possible to contain a plurality of external IP networks 1002 in the optical network easily while a multilayer cooperative function can be realized with high stability. If the multi-layer cooperation is available, it is possible to establish/release the optical path 1005 autonomously in cooperation with the external IP networks 1002; thus, it is possible to use optical resources, i.e., wavelengths and optical fibers effectively and efficiently. By doing this, it is possible to lower the network cost and provide a great capacity of IP services to users at a lower price.

Figure 6:
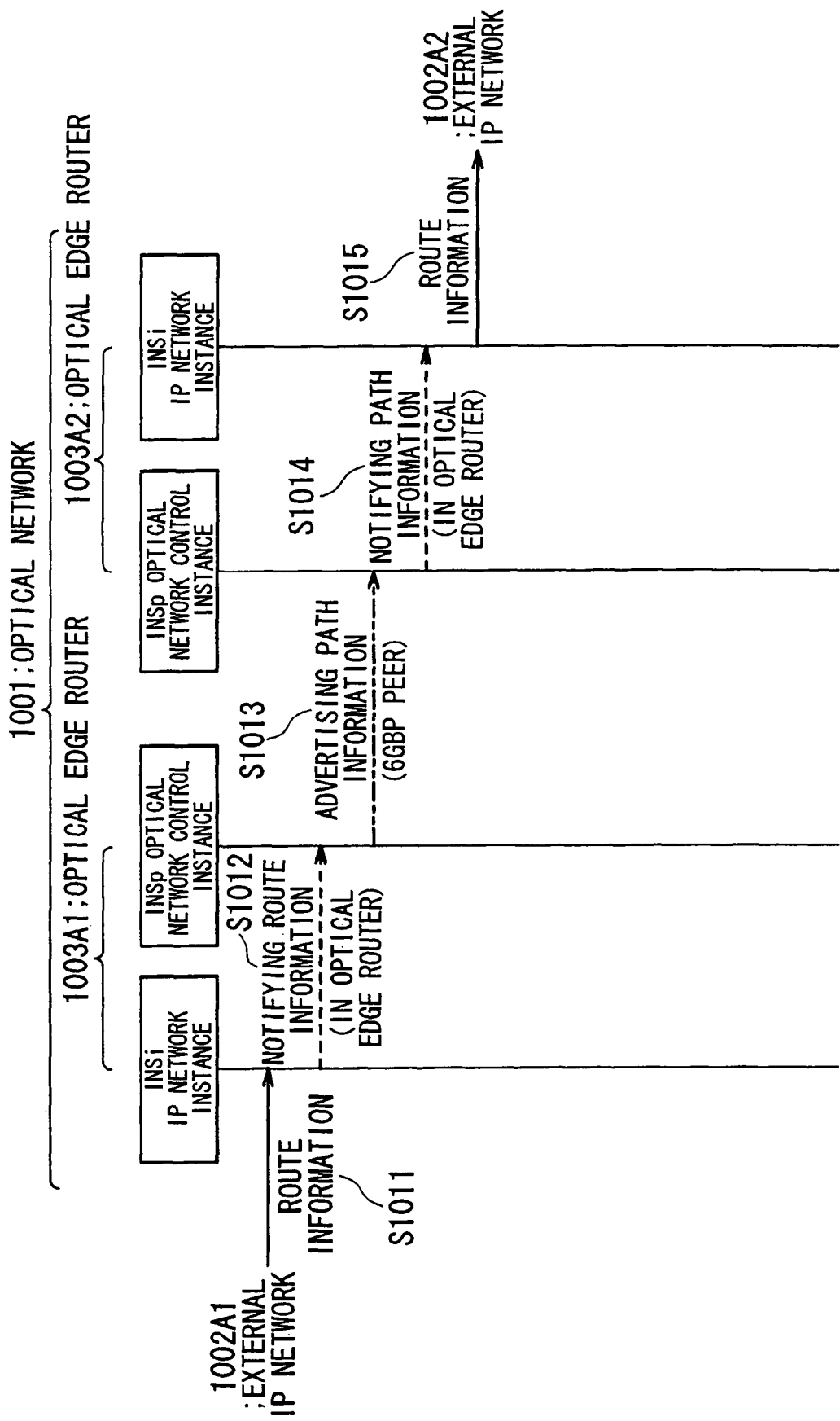
FIG. 6 is a sequential diagram showing a flow of route information in the embodiments.

FIG. 6 is a sequential diagram showing a flow of route information (route information in the external IP networks) in the embodiments. An example (the external IP network 1002A1→the optical network 1001→the external IP network 1002A2) of a flow of the route information in the external IP networks according to the present embodiment is explained with reference to this sequential diagram and FIG. 2, etc.

Firstly, the optical edge router 1003A1 in the optical network 1001 receives route information in the external IP network (step S11) transmitted from the external IP network 1002A1 by the routing protocol activated by the IP network instance INSi in the optical edge router 1003A1. Next, the optical edge router 1003A1 notifies the route information in the received external IP network to the optical network control instance INSp in the router 1003A1 (step S12). The optical network control instance INSp being notified of the route information in the external IP networks advertises to the optical edge router 1003A2, facing the same, for connecting the external IP network 1000A2 to the optical network 1001 of route information in the external IP networks via the BGP peer 1006 (step S13).

To add more explanation, the route information in the external IP network transmitted from the neighboring IP router R is processed/transmitted, in order, [the section 1311 for processing IP network routing protocol]→[the section 1314 for storing route information of the external IP networks]→[the section 1317 for notifying route information] and is advertised in the optical edge router 1003, facing the same, via the BGP peer 1006.

The optical edge router 1003A2 receiving the route information in the external IP networks advertised via the BGP peer 1006 notifies the received route information in the external IP networks from the optical network control instance INSp to the IP network instance INSi thereinside (step S14). This route information in the external IP networks is advertised in the external IP network by the routing protocol activated by the IP network instance INSi.

The present invention explained above is not limited to the above explained embodiment. The present invention can be modified/implemented variously within the scope of the concept of the invention.

For example, the external IP networks 1002 may be another type of optical network. Also, as long as the optical network 1001 is connected to the other external IP networks 1002 via the optical edge routers 1003, the inner structure in the optical network 1001 may be not limited specifically. For example, the optical cross connects 1004 should not be understood narrowly.

Second Embodiment

Figure 7:
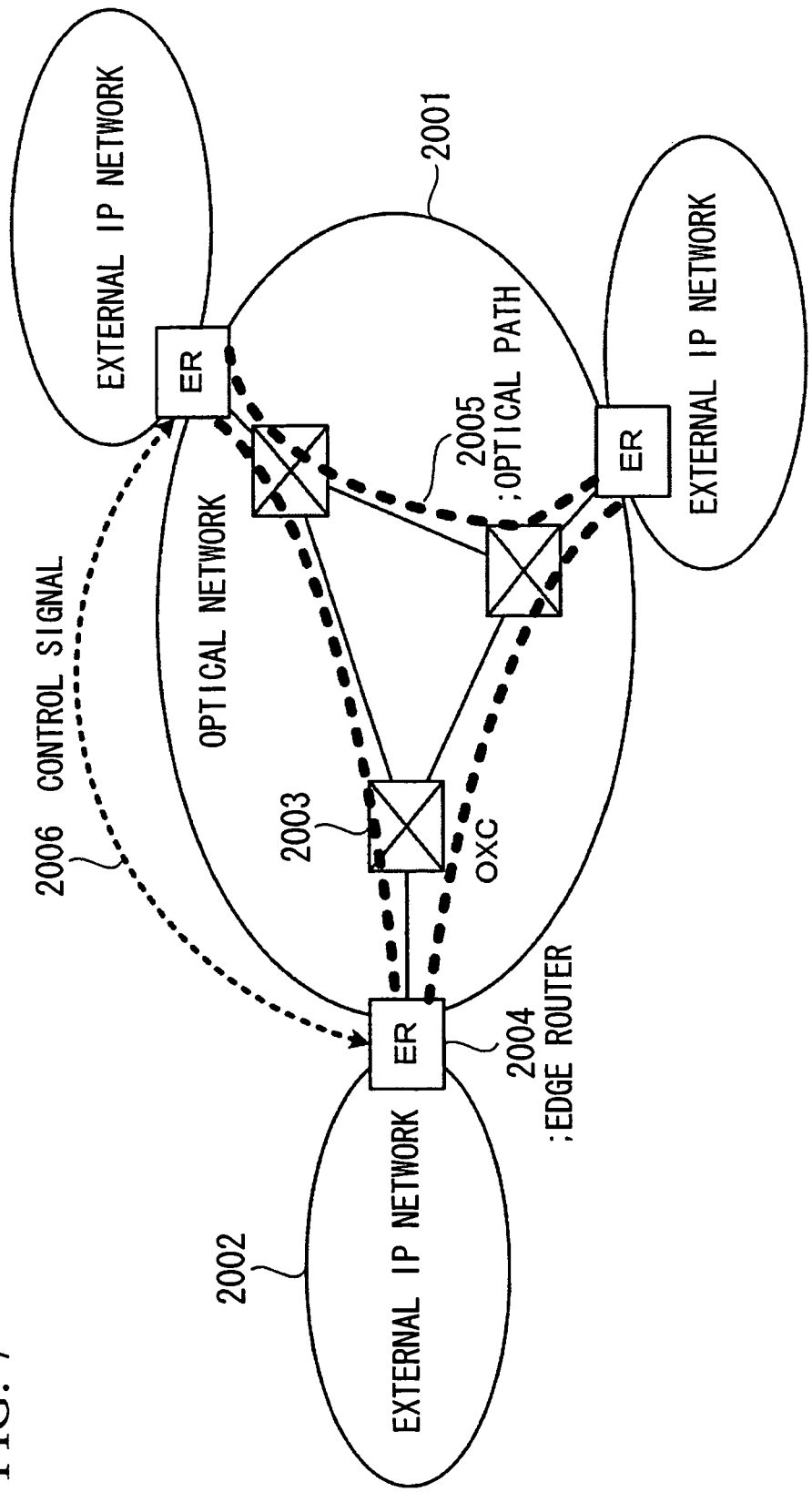
FIG. 7 is a view for explaining general structure of the optical network.
Figure 8:
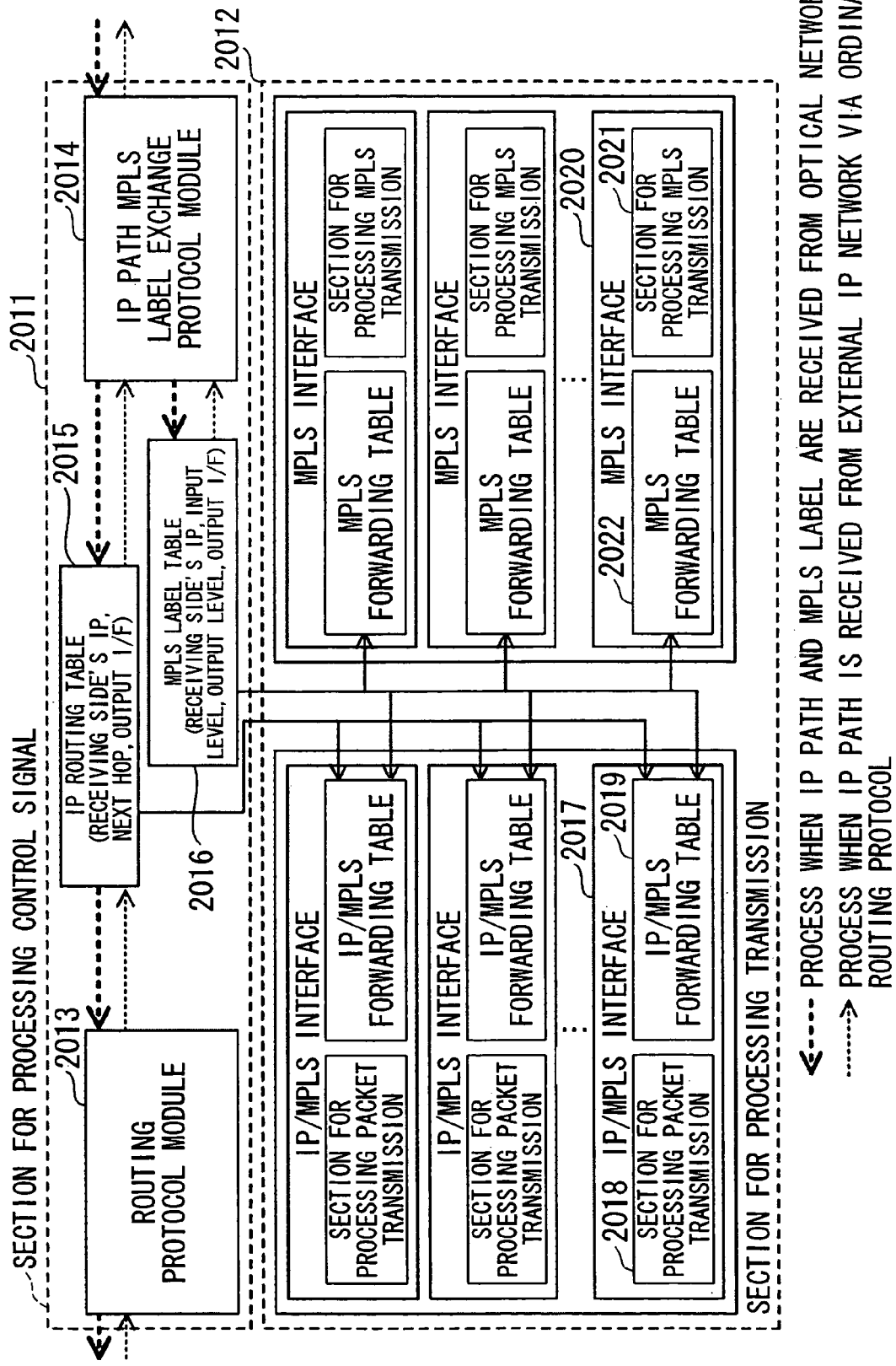
FIG. 8 is a view for explaining details of the optical cutting-through processes.
Figure 10:
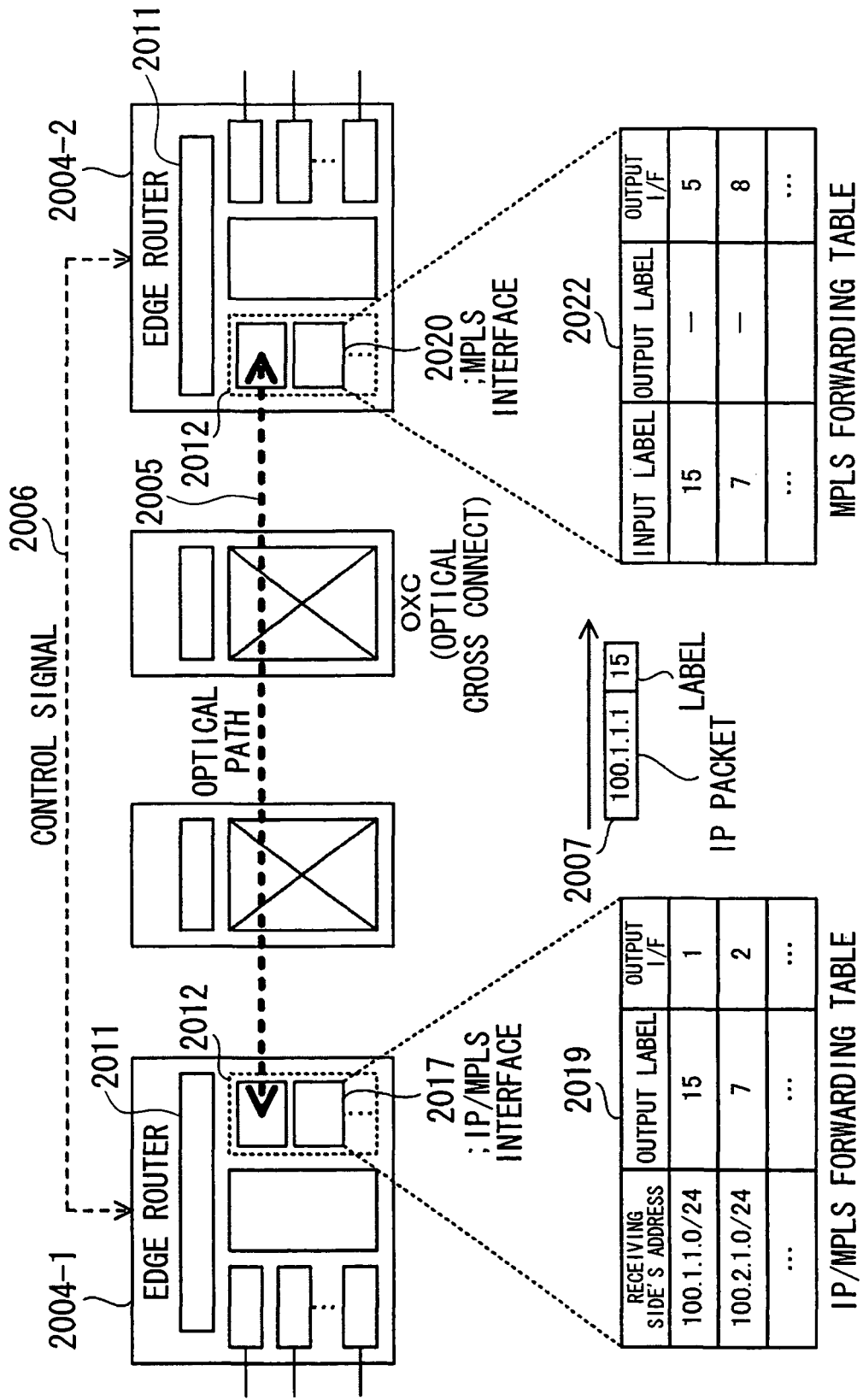
Figure 11:
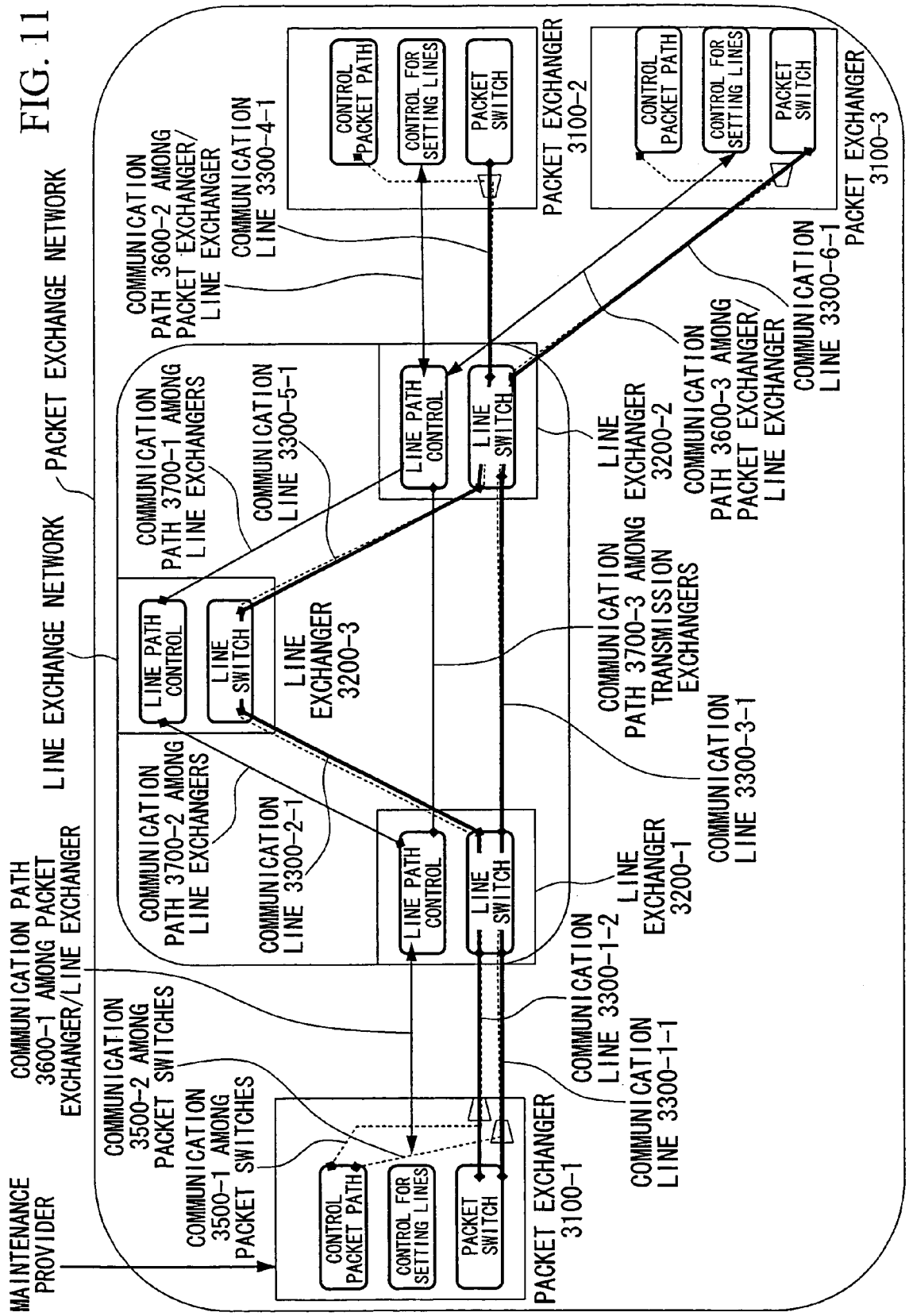
FIG. 11 is a view showing a first conventional structure in a data transmission network.
Figure 12:
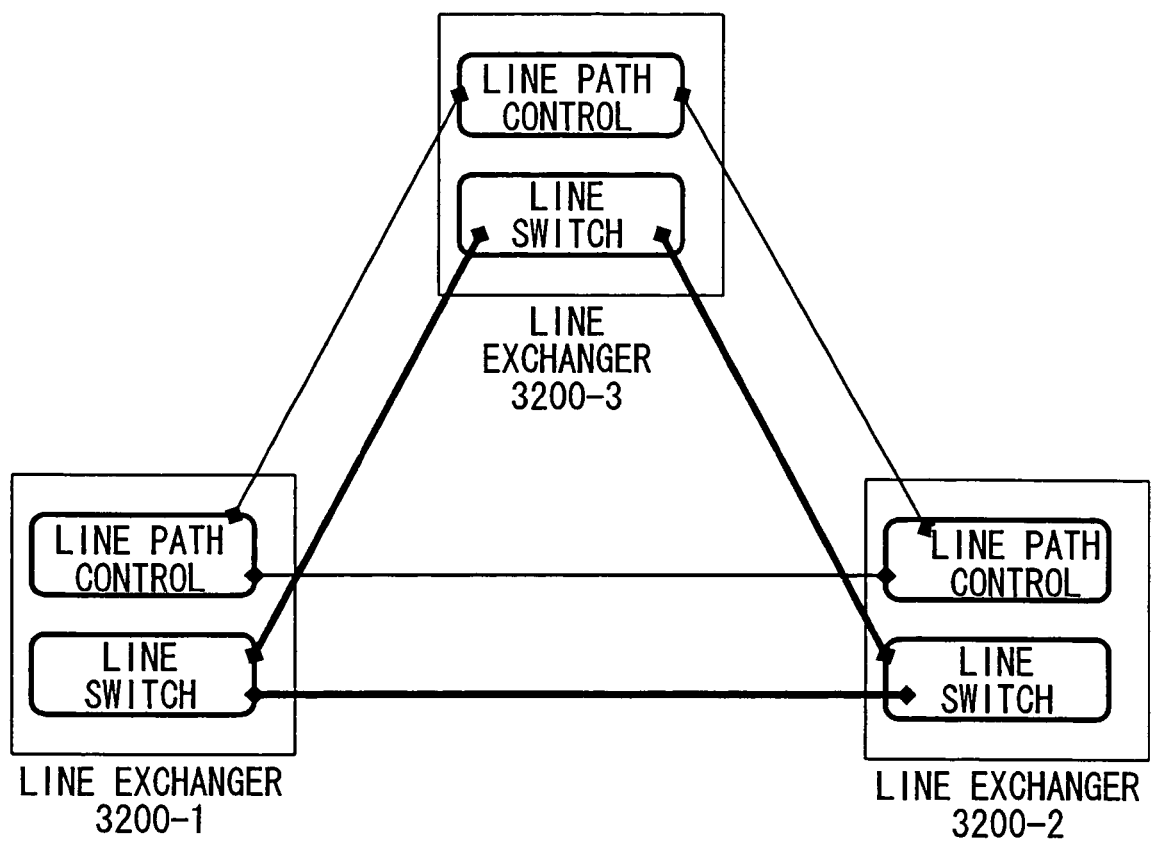
FIG. 12 is a view showing connection information in a line exchange network.
Figure 13:
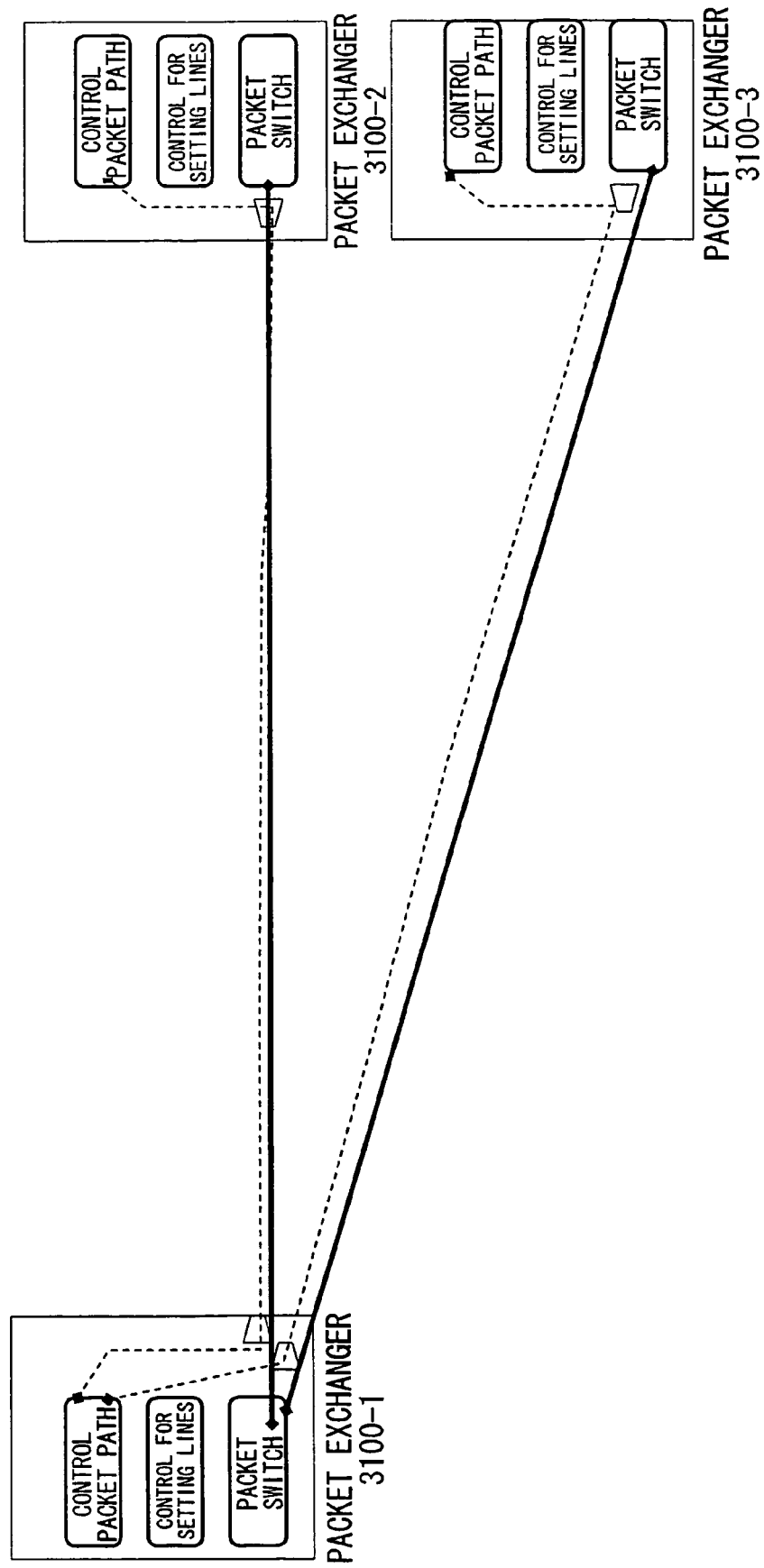
FIG. 13 is a view showing route information in a packet exchange network.
Figure 14:
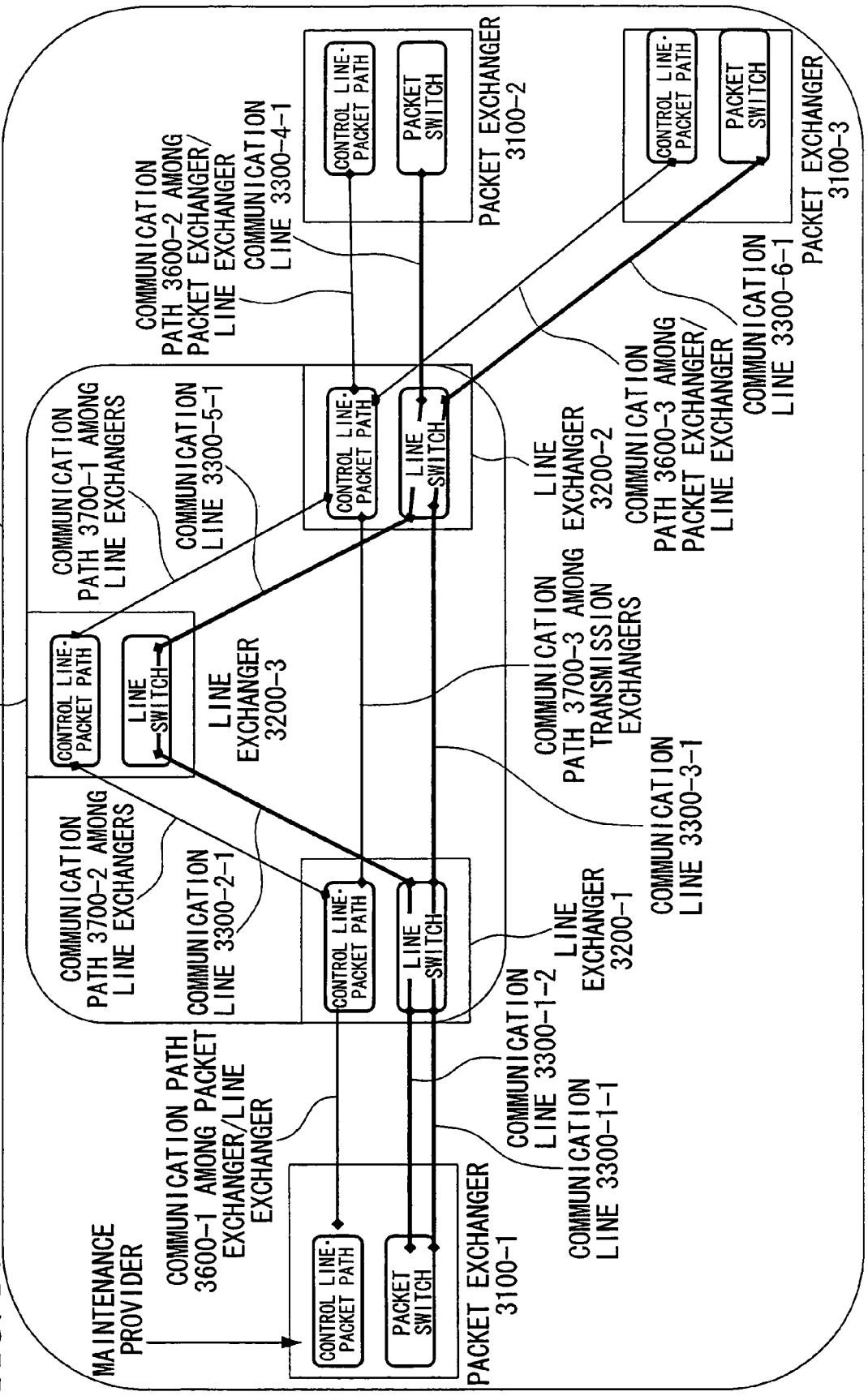
FIG. 14 is a view showing a second conventional structure in a data transmission network.
Figure 15:
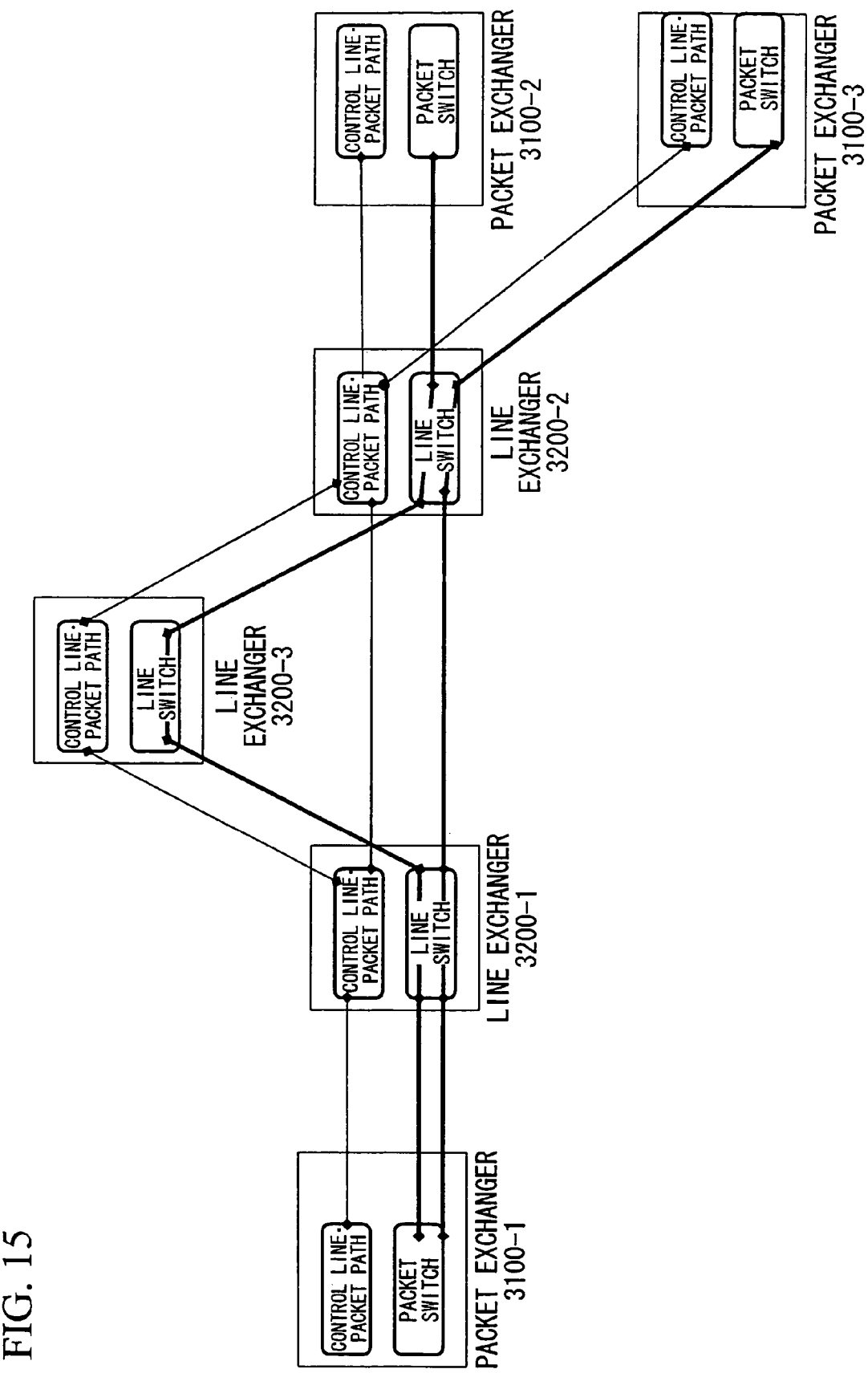
FIG. 15 is a view showing connection information in which the line exchange network and the packet exchange network shown in FIG. 14 are integrated.

A second embodiment of the present invention will be explained with reference to FIGS. 7 to 10. FIG. 7 is a schematic diagram for explaining an optical network. FIG. 8 is a view for explaining details of optical cutting-through processes. FIG. 9 is a view explaining an MPLS label table. FIG. 10 is a view for explaining a structure of the edge routers for realizing the optical cut-through.

As shown in FIG. 7, the present embodiment is an edge router comprising: an optical network 2001 as a core network; a plurality of external IP networks 2002, the networks 2001 and 2002 being connected at border points. As shown in FIG. 8, the edge router further comprises: IP/MPLS interface 2017 for processing incoming IP packets transmitted from the external IP networks 2002 to the optical network 2001; and an MPLS interface 2020 for processing outgoing IP packets transmitted from the optical network 2001 to the external IP networks 2002.

The present embodiment is characterized in that the IP/MPLS interface 2017 is provided with: an IP/MPLS forwarding table 2019 for maintaining lists, in which ingress-side IP address correspond to identifiers for showing outgoing interfaces of other edge routers; and a section 2018 for processing packet transmission for adding the identifiers corresponding to the ingress-side IP addresses to the IP packets in accordance with the IP/MPLS forwarding table 2019 when the IP packets are transmitted to the other edge routers, and the MPLS interface 2020 is provided with a section 2021 for processing MPLS transmission for transmitting the IP packets to the outgoing interface indicated by the identifiers by referring to the identifiers and the MPLS forwarding table 2022. The MPLS label is used for the identifier.

A section 2011 for processing control signals and exchanging information, in which the ingress-side IP addresses correspond to the identifiers, between the other edge router is provided. The IP/MPLS forwarding table 2019 generates/updates the list based on the correspondence information obtained by the section 2011 for processing control signals.

Embodiments of the present invention are explained in more details as follows. In the present embodiment, MPLS labels are used for the identifiers for indicating the outgoing interface in the egress edge router. The ingress-side IP addresses and MPLS label values are exchanged automatically by the control signals among the edge routers mutually. Also, a proposed core network is an optical network in which edge routers are connected directly by optical paths.

Firstly, as shown in FIG. 7, a network is proposed to have an optical network 2001 and a plurality of external IP networks 2002 connecting thereto. The optical network 2001 is formed by an OXC (optical cross connect) 2003 and a WDM. Direct IP communication is available among a plurality of the edge routers 2004 mutually, disposed on borders with respect to the external IP networks 2002 via the optical path 2005. Also, a control signal 2006, for exchanging the ingress-side IP addresses and its corresponding MPLS label values, flows between the edge routers 2004 mutually.

Firstly, a structure of the edge router is explained. As shown in FIG. 28, the edge router comprises, generally two sections, i.e., a section 2011 for processing control signals and a section 2012 for processing transmission. The section 2011 for processing control signals has two modules, i.e., a routing protocol module 2013 for exchanging the route information with the external IP networks 2002, and an IP path/MPLS label exchanging protocol module 2014 for exchanging the ingress-side IP addresses and the MPLS labels between the other edge routers connected to the optical network 2001. The section 2011 has two tables, i.e., an IP routing table 2015 for maintaining information in which the ingress-side IP addresses, next hop addresses, and outgoing interfaces correspond to each other, and an MPLS label table 2016 for maintaining information in which the ingress-side IP addresses, input label values, output label values, and outgoing interface numbers correspond to each other.

On the other hand, the section 2012 for processing transmission is formed by a plurality of IP/MPLS interfaces 2017 facing the external IP networks 2002 and a plurality of MPLS interfaces 2020 facing the optical network 2001. The IP/MPLS interfaces 2017 are formed by a section 2018 for processing packet transmission by the ingress-side IP addresses as a key and an IP/MPLS forwarding table 2019 which is referred to the packet transmission. Also, the MPLS interfaces 2020 is formed by a section 2021 for processing transmission by the MPLS label value as a key and an MPLS forwarding table 2022 which is referred to the transmission.

When the ingress-side IP addresses and the MPLS label values are received from the optical network 2001, the processes are as follows. Among the information, in which the ingress-side IP addresses received by the IP path/MPLS label exchanging protocol module 2014 and the MPLS label value correspond to each other, the information regarding the IP addresses is input into the IP routing table 2015, and all the information including the MPLS label value is input into the MPLS label table 2016. As similar with the routing table which belongs to an ordinary router, the received ingress-side IP addresses, corresponding next hop addresses, i.e., the IP addresses in the edge router facing the same, and the outgoing interface number directed to the edge router facing the same are input to the IP routing table 2015.

On the other hand, as shown in FIG. 9, the MPLS label table 2016 is formed by ingress-side IP addresses 2031, an input label value 2032, and an outgoing interface 2034. In this case, the ingress-side IP addresses received by the facing edge router are input into the ingress-side IP addresses 2031. The received MPLS labels are input into the output label value 2033. The outgoing interface numbers are input into the outgoing interface 2034.

Next, the routing protocol module 2013 advertises the new route information input into the IP routing table 2015 to the external IP networks 2002. Also, at the same time, the information input into the MPLS label table 2016 is converted into a format of a forwarding table which is referred to by the packet transmission and transmitted to the IP/MPLS interfaces 2017 and the MPLS interfaces 2020.

In contrast, if a new route information is received from the external IP networks 2002, the processes are as follows. Firstly, the routing protocol module 2013 receiving the route information writes the received path into the IP routing table 2015. The routing protocol module 2013 notifies to the IP path/MPLS label exchanging protocol module 2014 that the new route information is input into the IP routing table 2015. Then, the IP path/MPLS label exchanging protocol module 2014 reads out the newly-input route information from the IP routing table 2015 and allocates a corresponding label value to the path (ingress-side IP address). Furthermore, a list, in which the ingress-side IP addresses correspond to the allocated label value, is notified to the edge router, facing the same, by the control signal 2006 and input into the MPLS label table 2016. At this time, the ingress-side IP addresses read out from the IP routing table 2015 are input into the ingress-side IP addresses 2031. The label values allocated by the IP path/MPLS label exchanging protocol module 2014 are input into the output label value 2033. Finally, the information input into the IP routing table 2015 and the MPLS label table 2016 are converted into a forwarding table format which is referred at the packet transmission; thus, the information is transmitted to the IP/MPLS interfaces 2017 and to the MPLS interfaces 2020.

Next, the cutting-through method is explained in detail. As shown in FIG. 10, an edge router 2004-1 and an edge router 2004-2 are connected by an optical path via the optical network 2001. Firstly, relationships, in which the ingress-side IP addresses, located on the IP routing table 2015 maintained by the edge routers 2004-1 and 2004-2, correspond to the MPLS label values selected by the edge routers 2004-1 and 2004-2, are notified to the edge routers 2004-1 and 2004-2 facing each other by using the control signals 2006 between the edge routers 2004-1 and 2004-2.

For example, if the edge router 2004-2 maintains route information indicating 100.1.1.0/24 and 15 is selected as its corresponding label value, the combination is notified to the edge router 2004-1 by the control signals 2006. As a result, the edge router 2004-1 adds an entry indicating "add label 15 to the packet which will be transmitted to 100.1.10/24" into the IP/MPLS forwarding table 2019 disposed inside the edge router 2004-1.

Next, a case is proposed in which the IP packets 2007, which will be transmitted to 100.1.1 from the external IP networks 2002, are input into the edge router 2004-1. The edge router 2004-1 retrieves the IP/MPLS forwarding table 2019 by using the ingress-side IP address of the IP packet 2007 input into the IP/MPLS interfaces 2017 as a key, and obtains the output value (=15) and the outgoing interface number (=1). Consequently, the MPLS label having the label value (15) is added to the IP packet 2007 so as to be output to the optical network 2001. Switching operation at the IP packet level is not executed in the optical network 2001; that is, the IP packet 2007 is transmitted on the previously-established optical path 2005 so as to arrive at the MPLS interfaces 2020 in the edge router 2004-2. The edge router 2004-2 receiving the IP packet 2007 retrieves an MPLS forwarding table 2022 on the MPLS interfaces 2020, by using the added label value (=15) on the IP packet 2007 as a key and obtains the outgoing interface number (=5) which will be output to the external IP networks 2002. Consequently, the MPLS label is removed from the IP packet 2007 and transmitted from the outgoing interface.

In this way, the processes are limited to handling of the MPLS label in the interface near the optical network 2001; thus, it is possible to omit IP processes.

The edge router according to the present embodiment can be realized by computer apparatuses as information process apparatuses. That is, the present embodiment is a program, installed to computer apparatuses, for realizing functions corresponding to edge routers, one of the functions being an inputting function for connecting a core network 2001 and a plurality of external IP networks 2002 at border points mutually and handling incoming IP packets inputted from the external IP networks 2002 to the optical network 2001; and another one of the functions being an outputting function, corresponding to the MPLS interfaces 2020, for handling outgoing IP packets outputted from the optical network 2001 to the external IP networks 2002. In the program, the inputting function serves for: a function, corresponding to the IP/MPLS forwarding table 2019, for maintaining lists, in which ingress-side IP addresses correspond to identifiers for showing outgoing interfaces of other egress edge routers; and a function, corresponding to the section 2018 for processing packet transmission, for adding the identifier corresponding to the ingress-side IP addresses of the IP packets to the IP packets in accordance with the lists 2019 when the IP packets are transmitted to other edge routers. Also, the outputting function serves for a function, corresponding to the MPLS forwarding table 2022, for referring to the identifiers and transmitting the outgoing interface IP packets, indicated by the identifiers, to the outgoing interfaces. By installing this into the computer apparatuses, the apparatuses can be edge routers in accordance with the present embodiment. MPLS labels are used for the identifiers.

In addition, the program according to the present embodiment, being installed to computer apparatuses, realizes functions of the edge routers, the functions being: a function, corresponding to a section 2011 for processing control signals, for exchanging information, in which the ingress-side IP addresses correspond to the identifiers, among other edge routers mutually by the control signals; and another function being a function, corresponding to the IP/MPLS forwarding table 2019, for generating or updating the lists in accordance with the information obtained by the section 2011 for processing control signals.

The program according to the present embodiment is recorded on the recording medium according to the present invention; therefore, the program can be installed to the computer apparatuses by this recording medium. Otherwise, the program according to the present embodiment can be installed to the computer apparatuses directly from a server maintaining the program according to the present invention via a network.

By doing this, a part of the IP processes in the edge router is omitted by using the computer apparatus, etc., and it is possible to realize a cutting-through method and edge router for reducing the cost of the edge router and improving scalability.

Embodiment 3

Figure 16:
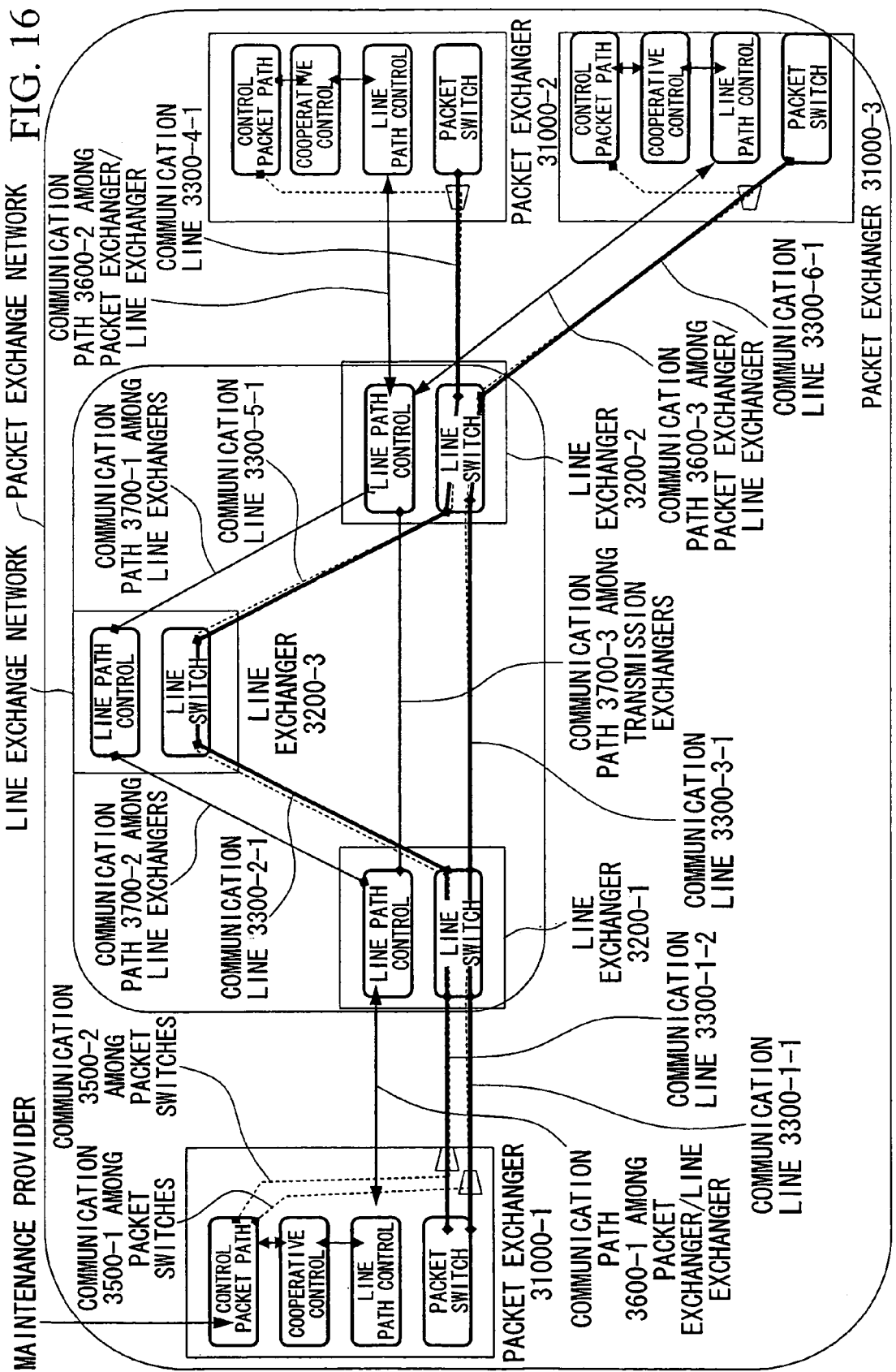
FIG. 16 is a view for explaining a structure of the data transmission network in a third embodiment of the present invention.

FIG. 16 is a view for explaining a structure of the data transmission network in a third embodiment of the present invention.

A plurality of line exchangers 3200 form a line exchange network in which at least communication lines 3300 are connected. A plurality of packet exchangers 31000 are connected to the line exchangers in this line exchange network via the communication lines 3300; thus, a packet exchange network is formed.

The line exchangers 3200 are formed by line switches and sections for controlling line paths.

The line switches are connected line switches in at least one other line exchanger via a plurality of communication lines.

Figure 17:
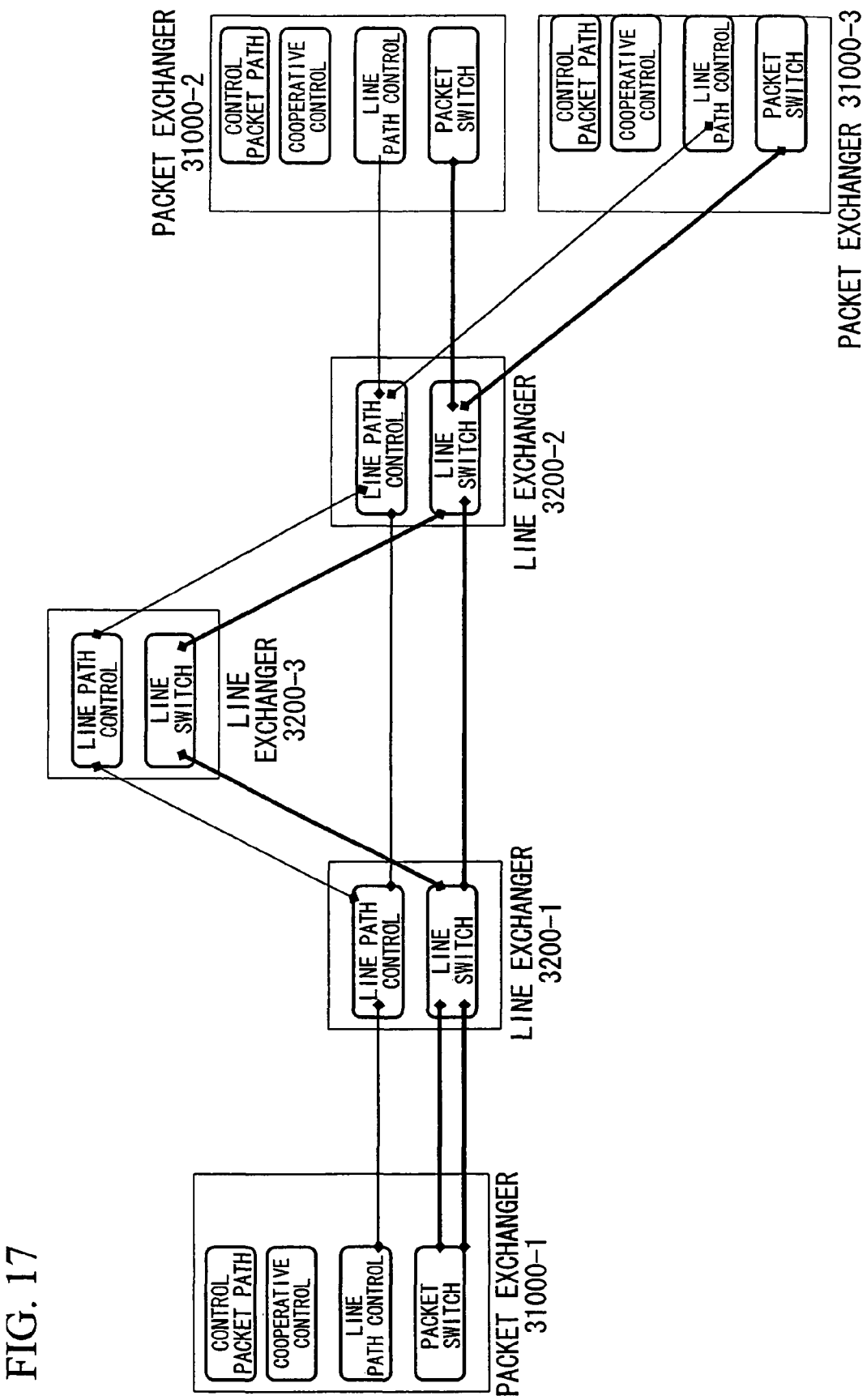
FIG. 17 is a view showing connection information in the line exchange network shown in FIG. 16.

The section for controlling line paths controls the line switches and combines two communication lines. The communication line is, i.e., an optical line, an SDH/SONET line, an ATM line, an MPLS-LSP line, or an FR line. The section for controlling line paths is connected to at least the section for controlling line paths in the other line exchangers 3200 and to sections for controlling line paths in packet exchangers 31000 by communication paths 3700 among the line exchangers and communication lines 3600 among packet exchangers/line exchangers respectively. The sections for controlling line paths exchange information, regarding the number of the communication lines for connecting and exchanging lines mutually, via the communication paths 3700 among the line exchangers. For example, it is possible to know a connection relationship in an entire line exchange network by using communication protocols, i.e., OSPF-TE (see prior art document 4) and a PNNI (prior art document 5). FIG. 17 is a view showing connection information in line exchange network.

The packet exchangers 31000 connected to the line exchangers are formed by packet switches, sections for controlling line paths, a cooperative control section, and sections for controlling packet paths.

The packet switches are connected to at least the line exchanger 3200 by the communication lines 3300.

The sections for controlling line paths are connected to the sections for controlling line paths in at least the line exchangers 3200 by communication lines 3600 among packet exchangers/line exchangers. The sections for controlling line paths collect information regarding the number of the communication lines in the line exchange network via the communication lines. For example, it is possible to know the connection relationship in an entire line exchange network by using communication protocols, i.e., OSPF-TE (see prior art document 4) and PNNI (prior art document 5). FIG. 17 is a view showing connection information in a line exchange network.

Figure 18:
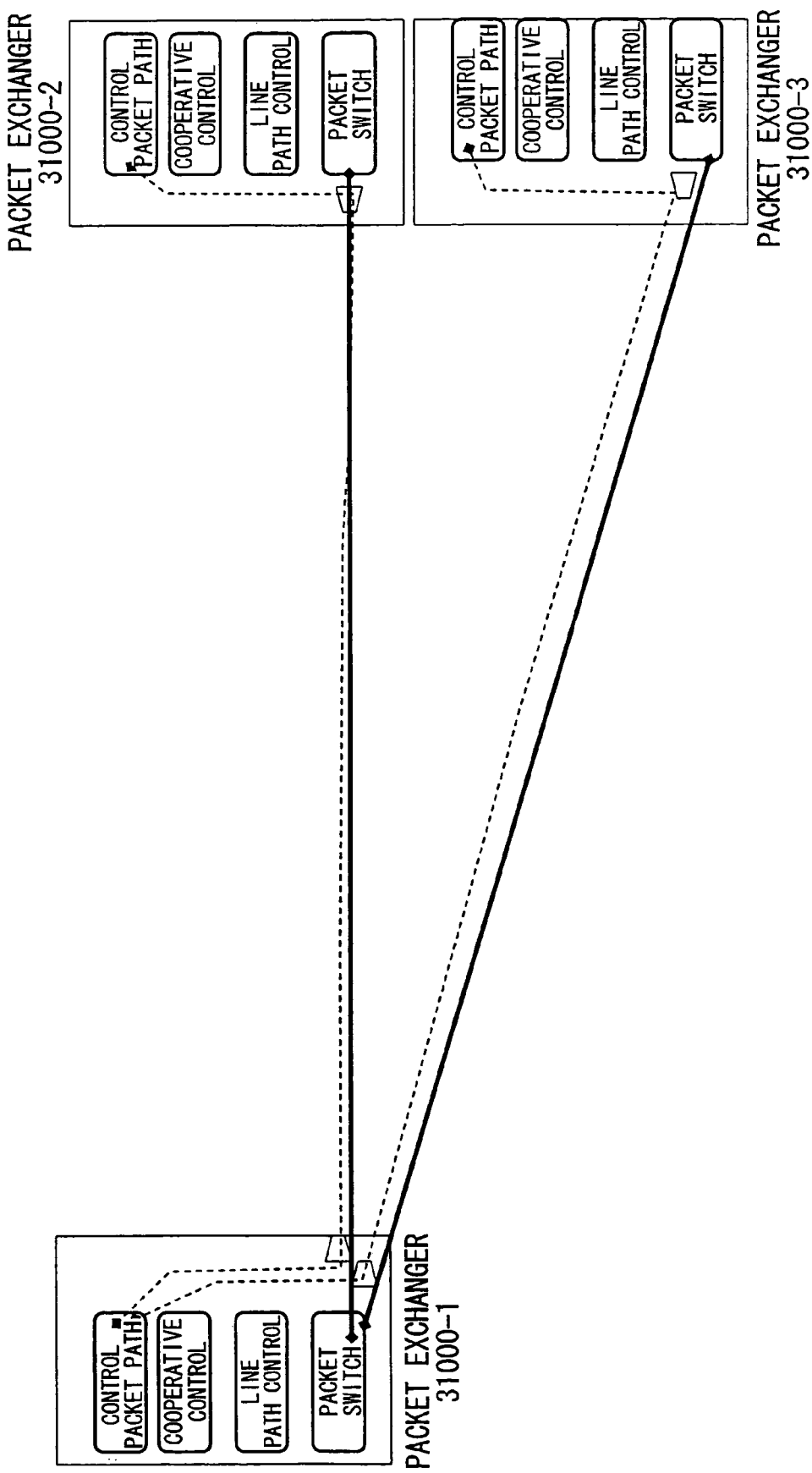
FIG. 18 is a view showing route information in the packet exchange network shown in FIG. 16.

Sections for controlling packet paths insert packet route information messages into the communication lines 3300 by packet insertion/extraction circuits. The inserted packet route information messages are transmitted to at least one of the other section for controlling packet paths via the communication lines 3300. By exchanging the messages, it is possible to obtain the connection-related information in the packet communication network mutually. FIG. 18 is a view showing route information in packet exchange network. It is possible to determine the packet transmission paths based on the route information. The packet exchange network corresponds to IP packet networks. It is possible to determine the connection relationship of the packet networks and the paths for transmitting packets by using protocols, i.e., OSPF (see prior art document 7). For example, it is determined that the packets transmitted from the packet exchanger 31000-1 to the packet exchanger 31000-3 are transmitted to the communication line 3300-1-1.

If the parties, i.e. maintenance providers, instruct to set new communication lines between arbitrary two packet exchangers, the cooperative control section refers to two information, i.e., connection information, collected by the section for controlling line paths, in the line exchangers, and connection information, collected by the sections for controlling packet paths, in the packet exchangers, selects the communication lines, and instructs the section for controlling line paths to send out a message for setting and controlling connected lined. For example, the communication lines 3300-1-2, 3300-2-1, 3300-5-1, and 3300-4-1 are connected by the line switches among a packet exchanger 31000-1 and a packet exchanger 31000-2; thus, it is determined that the communication lines amonth the packet exchanges 31000-1 and 31000-2 are connectable. The section for controlling line paths sends out a message for setting and controlling connected lines and is transmitted to line exchanger 3200-1. The line exchange 3200-1, having received the message for setting and controlling lines sets the line based on the instructed paths.

Embodiment 4

FIG. 19 is a view for explaining a fourth embodiment of the present invention.

In contrast to embodiment 3, in this embodiment, the packet exchangers and the line exchangers are integrated to form packet line exchangers 32000. As shown in FIG. 19, data transmission network according to the present embodiment is formed by at least the line exchanger 3200, a plurality of packet exchangers 31000, the packet/line exchangers 32000-1, and communication lines for connecting these exchangers.

The packet/line exhangers 32000-1 are provided with line switch LS, packet switches, sections for controlling line paths, sections for controlling line paths according to the present according to the present embodiment, the sections for controlling line paths in the packets exchangers 31000 according to the embodiment 3, and the section for controlling line paths in the line exchangers 3200, are connected by internal communication paths.

Also, the line switches have a function for connecting the communication lines, connected to the line exchangers, arbitrarily. The packet switches have functions for selecting communication lines for transmitting the packets, transmitted by the communication lines, based on the packet-ingress-side's information and output the same. The sections for controlling line paths are connected to the sections for controlling line paths in the line exchangers by the communication paths among the line exchangers. The sections for controlling line paths have a function for acknowledging line-connection-conditions in the communication network by exchanging the connection information in the communication lines. The sections for controlling packet paths have functions for acknowledging the connection-related information regarding packet exchange and determining the communication lines for outputting the same based on the packet-ingress-side's information, by exchanging the information regarding packet paths via the communication lines between the sections for controlling packet paths and the packet exchangers connected by the communication lines. The cooperative control section has a function for receiving instructions for setting new communication lines, instructed by parties, i.e., maintenance providers. If the instruction regarding setting of the new communication lines is received, the cooperative control section refers to two information, i.e., connection information, collected by the section for controlling line paths, in the line exchangers, and connection information, collected by the sections for controlling packet paths, selects the communication lines for the new communication lines, and instructs the section for controlling line paths of the new communication lines. The sections for controlling line paths set the communication lines among the packet exchangers and the packet/line exchangers in accordance with the paths instructed by the cooperative control sections, by sending the message for setting and controlling the connected lines and setting lines to the line exchangers, setting the communication lines based on the message for setting and controlling the connected lines by the line exchangers having received the message for setting and controlling the connected lines, and transmitting the message in accordance with the instructed paths.

Regardless of whether or not the packet exchangers and the line exchangers are integrated, there is no functional difference; therefore, it is possible to exchange packet data similarly.

The present invention obtained by the inventors is explained specifically in accordance with the embodiments. It should be noted certainly that the present invention is not limited to the above embodiments, and various modifications may be made within the range of the concept of the present invention.

INDUSTRIAL APPLICABILITY

According to the present invention, it is possible to improve efficiency for using optical resources by including a plurality of IP networks in a single optical network. Also, it is possible to control the optical paths autonomously in accordance with the IP network condition; thus, it is possible to reduce operational costs.

As explained above, according to the present invention, retrieving the IP addresses necessary to be conducted on both sides of the edge routers in the optical network is limited to an ingress edge router; therefore, it is possible to select the outgoing interface in the egress edge router by only handling the identifiers, i.e., MPLS labels. Therefore, it is possible to simplify processes necessary in the interfaces near the optical network. By doing this, it is possible to use the edge routers economically. In addition, because the interface speed may be increased by the simple processes, it is possible to reduce the number of the paths in the core network by increasing the speed with respect to a path; thus, it is possible to improve scalability.

Also, fluctuations in the topology of the optical paths are invisible from the external IP networks; thus, it is possible to maintain the routing operation in the IP network stably. That is, it is possible to realize a multi-layer cooperative function and provide highly safe optical networks, etc.

According to the network system for data transmission of the present invention, it is possible to dispose the communication lines among the packet exchangers optimally by using the information regarding the line exchange network. Also, it is possible to dispose the communication lines and the packet exchangers optimally by using the information regarding the line exchange network by the packet/line exchangers.

The invention claimed is:

1. An optical network comprising:
sections for establishing optical paths using Open Shortest Path First-Traffic Engineering (OSPF-TE) as a routing protocol and Resource reSerVation Protocol-Traffic Engineering (RSVP-TE) as a signaling protocol, for Generalized Multi-Protocol Label Switching (GMPLS);
a plurality of optical edge routers for connecting external IP networks to the optical network; and
a plurality of optical cross connects, for connecting the optical edge routers by the optical paths, having switching sections with respect to an optical path unit, wherein
each of the optical edge routers has both of:
an IP network instance for maintaining a routing table in each of the external IP networks and activating routing protocols between the external IP networks and the IP network instance, the routing protocols including a routing protocol for exchanging route information of the external IP networks with neighboring nodes in the external IP networks; and
an optical network control instance for collecting topology information and resource information in the optical network from a neighboring node, maintaining the topology information in the optical network and switching/signaling the optical paths based on at least one of topology and the route information for the external IP networks learned from the activated routing protocols,
wherein Border Gateway Protocols (BGPs) are used for the routing protocol for exchanging the route information of the external IP networks,
wherein the optical paths are wavelength paths, and
wherein the optical network control instances are provided so as to be used by all the external IP networks,
wherein the IP network instances corresponding to all the external IP networks are provided independent of each other, and
wherein an IP routing neighborhood relationship is established between the optical edge routers and the neighboring nodes in the external IP networks.

2. A computer program, embedded in a non-transitory computer readable medium, used for an optical network and optical edge routers having sections for predetermined calculations and sections for transmitting packets between the section for predetermined calculations and external IP networks, wherein the section for the predetermined calculations comprises functions of:
establishing an IP routing neighborhood relationship between the optical edge routers and neighboring routers in the external IP networks;
activating a routing protocol to exchange route information in the external IP networks with the neighboring routers in the external IP networks;

producing a routing table and storing the produced routing table in a storage section;

controlling switching of the optical paths based on at least one of topology and the route information in the storage section regarding the external IP networks;

collecting topology information and resource information inside the optical network from a neighboring node and storing the collected topology information in the storage section using Open Shortest Path First-Traffic Engineering (OSPF-TE) as a routing protocol;

signaling so as to establish/release the optical paths using Border Gateway Protocol (BGP);

notifying the route information to other optical edge routers which face an optical edge router; and reading out the routing tables and the topology information from the storage sections and producing a packet forwarding table which sets where the packets are to be transmitted to by the section for transmitting the packets, wherein the optical paths are wavelength paths, wherein the function of activating the routing protocol to exchange the route information and the function of producing the routing table provide an IP network instance of the optical edge router, wherein the function of controlling the switching, the function of collecting the topology information, the function of signaling, and the function of notifying the route information provide an optical network control instance of the optical edge router, wherein the optical network control instance is provided so as to be used by all the external IP networks, wherein the IP network instance is provided independent of IP network instances of the other optical edge routers corresponding to other external IP networks, and wherein the optical edge routers are provided in the optical network that is provided independent of the external IP networks.

* * * * *